US006647510B1

(12) United States Patent
Ganesh et al.

(10) Patent No.: US 6,647,510 B1
(45) Date of Patent: *Nov. 11, 2003

(54) METHOD AND APPARATUS FOR MAKING AVAILABLE DATA THAT WAS LOCKED BY A DEAD TRANSACTION BEFORE ROLLING BACK THE ENTIRE DEAD TRANSACTION

(75) Inventors: Amit Ganesh, Mountain View, CA (US); Gary C. Ngai, Saratoga, CA (US); Dieter Gawlick, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 09/748,408

(22) Filed: Dec. 22, 2000

Related U.S. Application Data

(63) Continuation of application No. 09/156,557, filed on Sep. 17, 1998, now abandoned, which is a continuation-in-part of application No. 09/141,765, filed on Aug. 27, 1998, now Pat. No. 6,182,241, which is a continuation of application No. 08/618,443, filed on Mar. 19, 1996, now Pat. No. 5,850,507.

(51) Int. Cl.$^7$ .............................................. H02H 3/05
(52) U.S. Cl. ....................................................... 714/16
(58) Field of Search .............................. 714/15, 16, 19, 714/18, 20, 2; 707/202

(56) References Cited

U.S. PATENT DOCUMENTS

| | | | |
|---|---|---|---|
| 5,065,311 A | 11/1991 | Masai et al. | 395/182.18 |
| 5,155,678 A | 10/1992 | Fukumoto et al. | 395/425 |
| 5,170,480 A | 12/1992 | Mohan et al. | 395/600 |

(List continued on next page.)

OTHER PUBLICATIONS

Mohan et al., Aries–RRH: Restricted Repeating of History in TEH Aries Transaction Recovery Method, Data Engineering, 7$^{th}$ Intl Conf, IEEE, pp. 718–727, Dec. 1991.

Microsoft Press, "Microsoft Press Computer Dictionary, Third Edition," pp. 408, Sep. 1997.

Oxford University Press, "Dictionary of Computing, Fourth Edition," pp. 125, 299, Dec. 1996.

IBM Corp., IBM Technical Disclosure Bulletin, vol. 28, No. 3, pp. 950–951, Dec. 1991.

Primary Examiner—Dieu-Minh Le
(74) Attorney, Agent, or Firm—Marcel K. Bingham; Hickman Palermo Truong & Becker LLP

(57) ABSTRACT

A method and apparatus for removing changes made by a dead transaction is provided. According to the method, a first change is performed by the dead transaction prior to a second change. The first change made by the dead transaction is then undone prior to undoing the second change made by the dead transaction. According to another aspect of the invention, a method and apparatus for applying changes in redo records to make a particular resource reflect changes made to the particular resource in volatile memory before a failure is provided. The method includes establishing links that link together a set of redo records that contain changes made to the particular resource. The links are then followed to apply the changes contained in the set of redo records to cause the particular resource to reflect the changes made to the particular resource in volatile memory before the failure. According to another aspect of the invention, a method and apparatus for applying changes in two or more redo records in parallel is provided. According to the method, a plurality of resources are locked by a dead transaction. A plurality of sets of redo records are established that do not contain any redo records that depend on any redo records in any other set of redo records. The plurality of sets of redo records are applied in parallel relative to one another.

52 Claims, 17 Drawing Sheets

U.S. PATENT DOCUMENTS

| | | | |
|---|---|---|---|
| 5,201,044 A | 4/1993 | Frey, Jr. et al. | 395/800 |
| 5,280,611 A * | 1/1994 | Mohan et al. | 707/8 |
| 5,333,303 A * | 7/1994 | Mohan | 714/20 |
| 5,333,314 A | 7/1994 | Masai et al. | 395/600 |
| 5,335,343 A | 8/1994 | Lampson et al. | 395/575 |
| 5,440,727 A | 8/1995 | Bhide et al. | 395/444 |
| 5,481,699 A | 1/1996 | Saether | 395/182.18 |
| 5,485,608 A * | 1/1996 | Lomet et al. | 707/202 |
| 5,524,205 A | 6/1996 | Lomet et al. | 395/182.14 |
| 5,524,239 A | 6/1996 | Fortier | 395/600 |
| 5,524,241 A | 6/1996 | Ghoneimy et al. | 395/600 |
| 5,551,046 A | 8/1996 | Mohan et al. | 395/800 |
| 5,561,795 A | 10/1996 | Sarkar | 395/600 |
| 5,596,710 A | 1/1997 | Voigt | 395/182.17 |
| 5,630,047 A * | 5/1997 | Wang | 714/15 |
| 5,734,817 A | 3/1998 | Roffe et al. | 395/182.13 |
| 5,819,020 A | 10/1998 | Beeler, Jr. | 395/182.03 |
| 5,850,507 A * | 12/1998 | Ngai et al. | 714/16 |
| 5,857,204 A | 1/1999 | Lordi et al. | 707/202 |
| 5,933,838 A | 8/1999 | Lomet | 707/202 |
| 5,974,563 A | 10/1999 | Beeler, Jr. | 714/5 |
| 6,067,550 A | 5/2000 | Lomet | 707/202 |
| 6,182,241 B1 * | 1/2001 | Ngai et al. | 714/16 |
| 6,185,577 B1 | 2/2001 | Nainani et al. | 707/202 |
| 6,185,699 B1 | 2/2001 | Haderle et al. | 714/19 |
| 6,295,610 B1 | 9/2001 | Ganesh et al. | 714/19 |

* cited by examiner

TRANSITION TABLE # 7 (1100)

| SLOT | SEQUENCE # | STATUS | ••• | DEAD | TX PTR |
|---|---|---|---|---|---|
| 0 | 7 | COMMITED | | 0 | |
| 1 | 9 | ACTIVE | | 1 | ● |
| 2 | 5 | COMMITED | | 0 | |
| ⋮ | ⋮ | ⋮ | | ⋮ | ⋮ |

710 — 712 — 742

CONTAINER #722

TRANSACTION LIST

| INDEX | TID | FLAG | LOCK COUNT | ••• | UNDO PTR |
|---|---|---|---|---|---|
| 1 | 7,3,8 | C | — | | ● |
| 2 | 7,1,9 | A | 2 | | ● |
| ⋮ | ⋮ | ⋮ | ⋮ | | ⋮ |

748  750  752  754  756

724 — 728

| ROW # | LOCK # | DATA |
|---|---|---|
| 1 | 2 | |
| 4 | 0 | |
| 5 | 0 | |
| 6 | 7 | |
| ⋮ | | |

| FIG. 11-1 | FIG. 11-2 |
|---|---|

METHOD AND APPARATUS FOR MAKING AVAILABLE DATA THAT WAS LOCKED BY A DEAD TRANSACTION BEFORE ROLLING BACK THE ENTIRE DEAD TRANSACTION

This application is a continuation of U.S. patent application Serial No. 09/156,557, filed on Sep. 17, 1998 now abandoned, entitled "Method and Apparatus for Making Available Data That Was Locked by a Dead Transaction Before Rolling Back the Entire Dead Transaction", of which is a continuation-in-part of U.S. patent application Serial No. 09/141,765, filed on Aug. 27, 1998, now U.S. Pat. No. 6,182,241 entitled "Method and Apparatus for Improved Transaction Recovery", of which is a continuation of U.S. patent application Serial No. 08/618,443, filed Mar. 19, 1996, entitled; "Method and Apparatus for Improved Transaction Recovery" and issued as U.S. Pat. No. 5,850,507 on Dec. 15, 1998, the contents of which are incorporated herein by reference in their entirety.

The present Application is also related to U.S. patent application Ser. No. 09/156,548, entitled "Parallel Transaction Recovery," filed by Amit Ganesh and Gary C. Ngai on Sep. 17, 1998 and U.S. patent application No. 09/156,551, entitled "Recovering Resources In Parallel," filed by Amit Ganesh and Gary C. Ngai on Sep. 17, 1998.

FIELD OF THE INVENTION

The present invention relates to database management systems (DBMS). More specifically, the present invention relates to a method and apparatus for making available data that was locked by a dead transaction before rolling back the entire dead transaction.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is atomic and comprised of one or more database language statements is referred to as a transaction. In a database server, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database instance.

A buffer cache resides in a portion of the system memory and holds database information. Buffers in the buffer cache hold copies of data blocks that have been read from data files. The buffers are shared by all user processes concurrently connected to the instance. When a transaction desires to make a change to a data block, a copy of the data block is loaded into a buffer and the change is made to the copy of the data block stored in the database buffer cache in dynamic memory. Afterwards, a database writer writes the modified blocks of data from the database buffer cache to the data files on disk.

The system memory also contains a redo log buffer. A redo log buffer is a buffer that holds information about update operations recently performed by transactions. This information is stored in redo entries. Redo entries contain the information necessary to reconstruct, or redo, changes made by operations such as INSERT, UPDATE, DELETE, CREATE, ALTER, or DROP, for example. Redo entries are generated for each change made to a copy of a data block stored in the database buffer cache. The redo log buffer is written to online redo log file(s) on disk. The records in the online redo log file(s) on disk are referred to as redo logs.

An instance failure can occur when a problem arises that prevents an instance from continuing work. Instance failures may result from hardware problems such as a power outage, or software problems such as an operating system or database system crash. Instance failures can also occur expectedly, for example, when a shutdown/abort statement is issued.

Due to the way in which database updates are performed to data files in some database systems, at any given point in time, a data file may contain some data blocks that (1) have been tentatively modified by uncommitted transactions and/or (2) do not yet reflect updates performed by committed transactions. Thus, an instance recovery operation must be performed after an instance failure to restore a database to the transaction consistent state it possessed just prior to the instance failure. In a transaction consistent state, a database reflects all the changes made by transactions which are committed and none of the changes made by transactions which are not committed.

A typical DBMS performs several steps during an instance recovery. First, the DBMS rolls forward, or reapplies to the data files all of the changes recorded in the redo log. Rolling forward proceeds through as many redo log files as necessary to bring the database forward in time to reflect all of the changes made prior to the time of the crash. Rolling forward usually includes applying the changes in online redo log files, and may also include applying changes recorded in archived redo log files (online redo files which are archived before being reused). After rolling forward, the data blocks contain all committed changes as well as any uncommitted changes that were recorded in the redo log prior to the crash. Rollback segments include records for undoing uncommitted changes made during the roll-forward operation. In database recovery, the information contained in the rollback segments is used to undo the changes made by transactions that were uncommitted at the time of the crash. The process of undoing changes made by the uncommitted transactions is referred to as "rolling back" the transactions.

FIG. 1 illustrates rolling forward and rolling back. Database 110 is a database requiring recovery at time $t_1$. Database 120 represents the database after a redo log is applied at time $t_2$. The database 120 comprises both changes made by committed transactions 121 and changes made by uncommitted transactions 122. Database 130 represents the database at time $t_3$ after a rollback segment is applied. The database 130 comprises only changes made by committed transactions 121.

When rolling back a transaction, the DBMS releases any resources (locked resources) held by the transaction at the time of failure. Lastly, the DBMS resolves any pending distributed transactions that were undergoing a two-phase commit coordinated by the DBMS at the time of the instance failure.

One disadvantage of the prior method of recovering after a crash of an instance of a database is that undo records for all uncommitted (dead) transactions must be applied before a user is allowed to execute a new transaction to access the database system. This can take a long period of time if there are a large number of dead transactions that need to be rolled back, even if many of the undo records for dead transactions are directed to data blocks that will not be accessed by the new transaction.

One enhancement that can be used to reduce the period of time that a user must wait before executing a new transaction is by rolling back changes, on an as needed transaction-by-transaction basis, depending on the particular data blocks that are of interest to the new transaction.

However, this enhancement also suffers from inefficiencies if the rollback of a dead transaction requires undo changes to be applied to a large number of data blocks, but the new transaction only requires access to a small number of those data blocks. Thus, a user may be required to wait a large period of time for undo changes to be applied to data blocks that are not of interest to the new transaction.

Based on the foregoing, it is highly desirable to provide a method and apparatus for reducing the number of undo changes that need to be applied when a new transaction encounters a resource that is locked by a dead transaction.

SUMMARY OF THE INVENTION

The present invention provides a method and apparatus for removing changes made by a dead transaction. According to the method, a first change is performed by the dead transaction prior to a second change. The first change made by the dead transaction is then undone prior to undoing the second change made by the dead transaction.

According to another aspect of the invention, the first change is undone by applying one or more undo changes contained in a first undo record to a first resource. The second change is undone by applying one or more undo changes contained in a second undo record to a second resource; the first resource and the second resource not being the same resource.

According to another aspect of the invention, a method and apparatus for applying changes in redo records to make a particular resource reflect changes made to the particular resource in volatile memory before a failure is provided. The method includes establishing links that link together a set of redo records that contain changes made to the particular resource. The links are then followed to apply the changes contained in the set of redo records to cause the particular resource to reflect the changes made to the particular resource in volatile memory before the failure.

According to another aspect of the invention, a method and apparatus for applying changes in two or more redo records in parallel is provided. According to the method, a plurality of resources are locked by a dead transaction. A plurality of sets of redo records are established that do not contain any redo records that depend on any redo records in any other set of redo records. The plurality of sets of redo records are applied in parallel relative to one another.

According to one aspect of the invention, the plurality of sets of redo records are established by assigning all redo records that are associated with a first resource to a first set of redo records and by assigning all redo records that are associated with a second resource to a second set of redo records.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for making available data that was locked by a dead transaction before rolling back the entire dead transaction is described. In the following description, for the purposes of explanation, numerous specific details are set forth in order to provide a thorough.understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
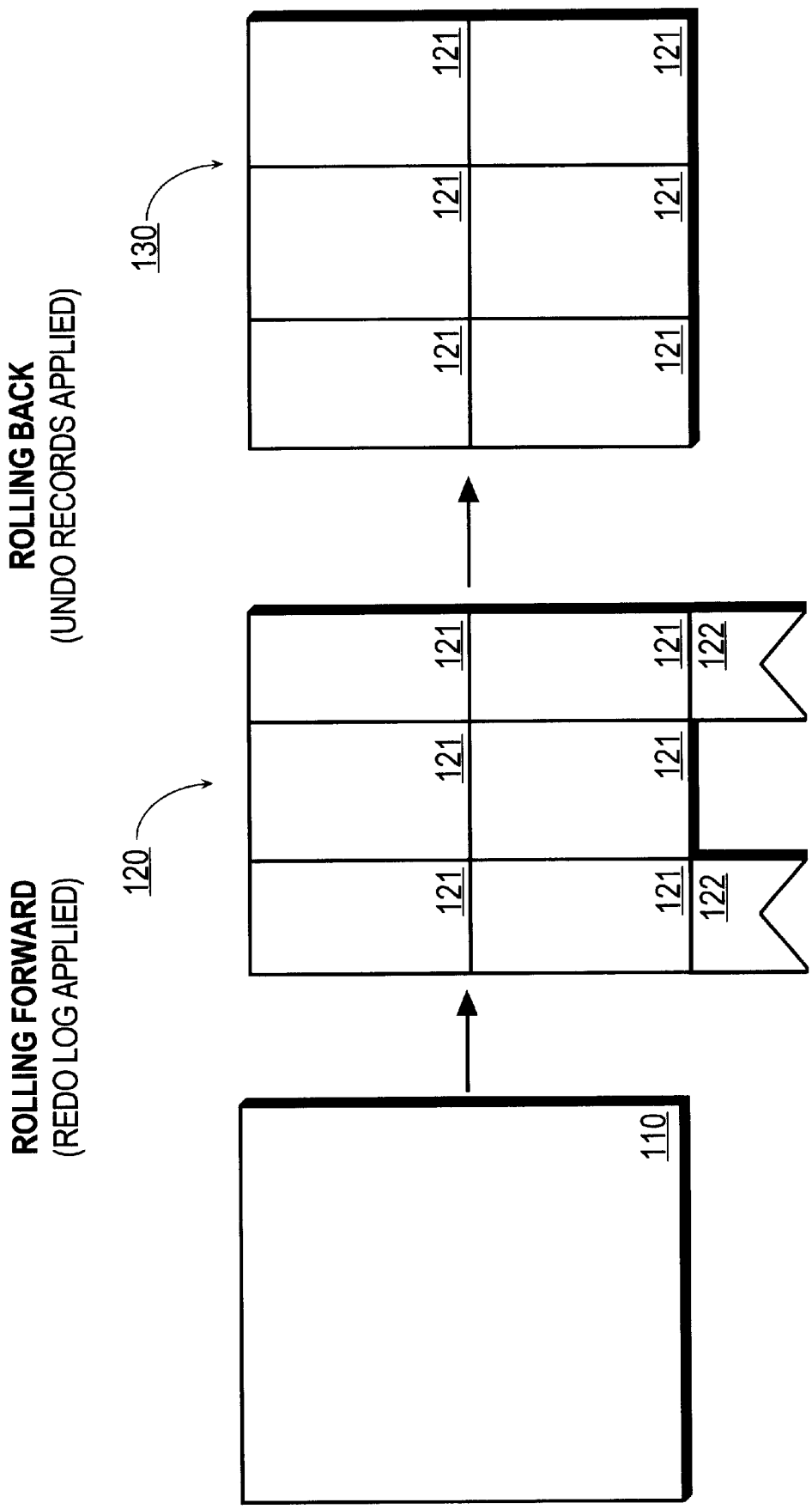
FIG. 1 illustrates rolling forward and rollback operations.
Figure 2:
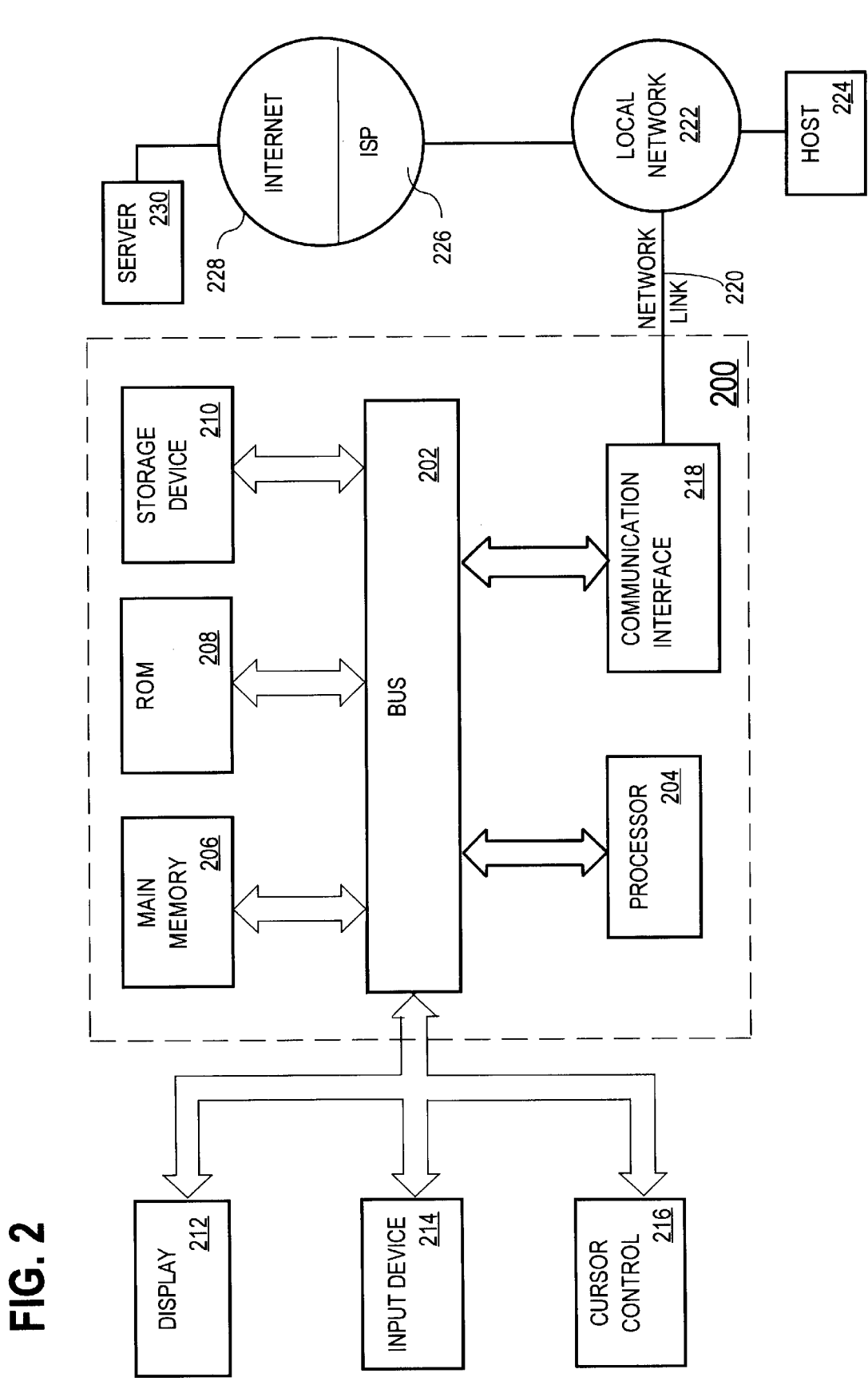
FIG. 2 is a block diagram of a system which may be programmed to implement the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for making available data that was locked by a dead transaction before rolling back the entire dead transaction. According to one embodiment of the invention, database recovery is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be.carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for database recovery as described herein.

The received code may be executed by processor 204 as it is received, and/or stored in storage device 210, or other non-volatile storage for later execution. In this manner, computer system 200 may obtain application code in the form of a carrier wave.

ROLLBACK SEGMENTS

Figure 3:
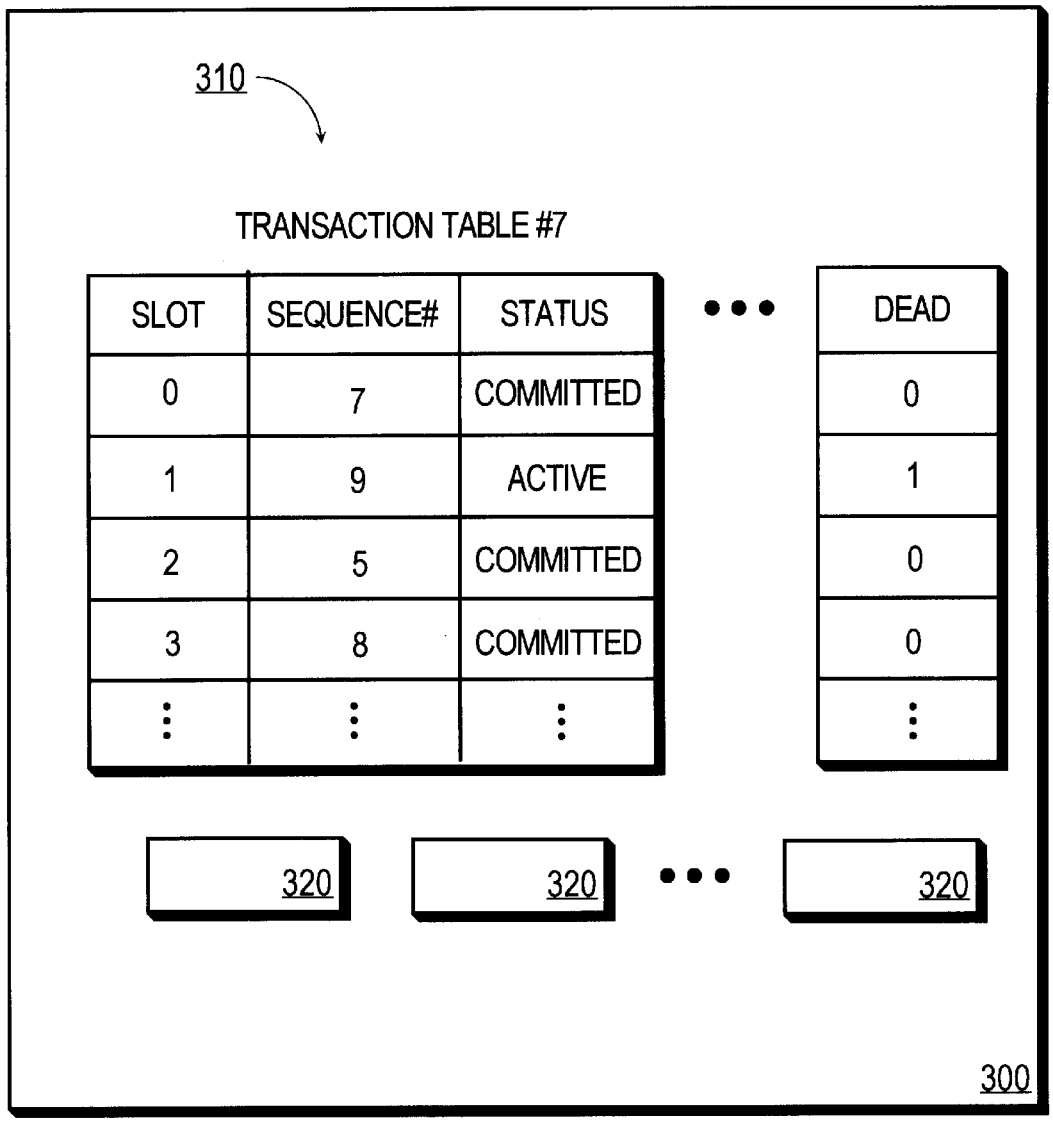
FIG. 3 illustrates a rollback segment header according to one embodiment of the present invention.

Each database contains one or more rollback segments. Each rollback segment may contain a transaction table and a plurality of rollback entries (undo records). After being rolled forward, a rollback segment contains state information of transactions before a crash. FIG. 3 illustrates an exemplary rollback segment 300 with transaction table 310 and rollback entries 320. A transaction table includes a plurality of slots, Where each slot can hold an entry that corresponds to a transaction. Each entry contains a sequence number, a status indication, and a field for indicating whether or not the corresponding transaction is dead.

According to certain embodiments, the number of entries that a particular transaction table can hold is limited. When a transaction table is full and an entry needs to be added for a new transaction, the entry that corresponds to the oldest transaction is overwritten with the new entry. To distinguish between transactions that have used the same slot, the sequence number for a slot is changed every time the slot is reused. For example, every time a slot is reused, the sequence number may be incremented.

To uniquely identify transactions, transaction IDs are generated from the information contained in the transaction table entries that correspond to the transaction. In one embodiment, the transaction ID of a transaction consists of the number of the transaction table that contains the entry for the transaction, the slot number that holds the entry, and the sequence number of the transaction.

Rollback entries are kept for transaction tables. A rollback entry contains undo information that specifies how to remove changes made to the database during an operation in a particular transaction. Rollback entries for the same transaction are linked together so the entries can easily be found if necessary for transaction rollback.

DATA CONTAINERS

Figure 4:
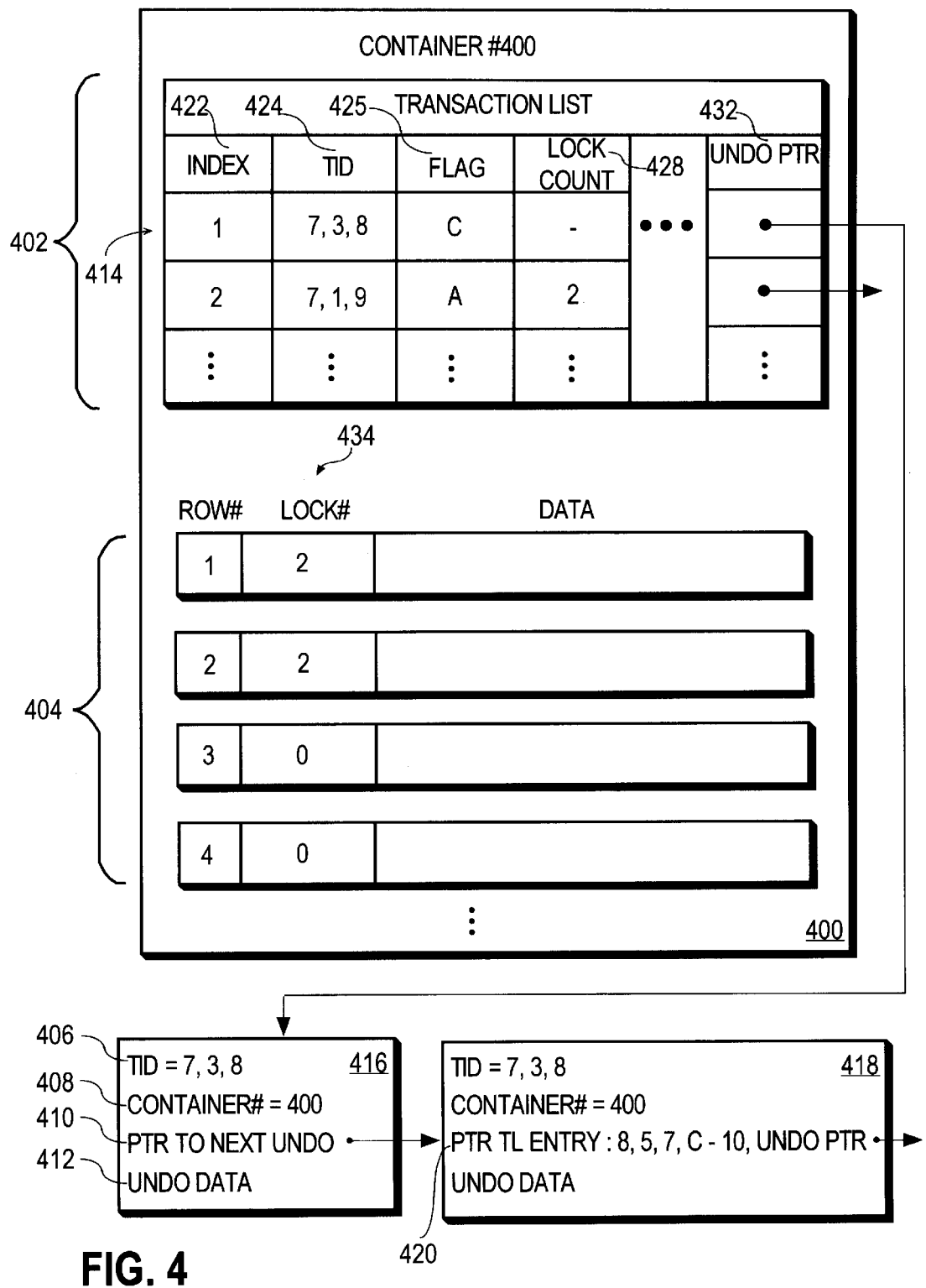
FIG. 4 illustrates a data container and rollback records of a database according to an embodiment of the invention.

When data in the database is changed in response to the execution of a transaction, the transaction ID of the transaction is stored with the data to identify the transaction that made the changes. Referring to FIG. 4, it illustrates an exemplary data container 400 (i.e. data block) of a database. The data container 400 includes a transaction list section 402 and a data section 404. The transaction list section 402 includes entries that correspond to transactions that have modified data container 400. Each entry includes an index number 422, a transaction ID 424, a status flag 425, a lock count indicator 428, and an undo pointer 432.

The status flag 425 indicates whether the transaction that corresponds to the entry is active or has committed. The lock count indicator 428 indicates how many rows within the block are write locked by the transaction. The undo pointer 432 points to a rollback entry in the rollback segment that indicates how to undo the most recent change made to the block by the transaction that corresponds to the entry.

The data section of the block includes rows of data. A portion of each row is used as a write lock indicator 434 to indicate whether the row is currently write locked. In the preferred embodiment, the write lock indicator 434 contains a number that indicates the entry in the transaction list belonging to the transaction that holds the lock on the row in question.

ROLLBACK ENTRIES

FIG. 4 also illustrates the contents of a rollback entry in a rollback segment and how the rollback entry is accessed by an undo pointer according to an embodiment of the invention. The rollback entry includes a transaction ID 406, a block number 408, a prior change pointer 410, and undo information 412. The transaction ID 406 identifies the transaction which performed the operation that corresponds to the undo record. The block number 408 indicates the data block (data container) on which the operation was performed. The undo information 412 contains data necessary for undoing the operation that was performed on the identified block by the identified transaction.

The undo pointer 410 points to a rollback entry 418 for undoing a previous change to the same data container by the same transaction. Each change made to the data container 400 by a transaction is linked in this manner to form a linked list of rollback entries. Linked lists that link together changes made to a particular container are referred to herein as "block-based undo chains". The undo pointer in the transaction list section 402 points to the end of the block-based undo chain that represents the most recent change made by the transaction to the data container 400. At the other end of the block-based undo chain is the undo record that corresponds to the first change made to the data container 400 by the transaction.

The rollback entry that corresponds to the first change made to the data container 400 by a particular transaction does not contain a pointer to an undo record for an earlier change to the data container 400 by the same transaction, since there can be no change earlier than the first change. Rather, the rollback entry that corresponds to the first change made by a transaction to a container contains the entry that was overwritten in the transaction list of the block by the entry for the transaction at issue.

In the illustrated example, the entry 414 corresponds to the transaction identified by the transaction ID "7,3,8". The undo pointer in entry 414 points to the rollback entry 416 that corresponds to the last change made to data container 400 by transaction "7,3,8". The undo pointer of rollback entry 416 points to rollback entry 418 that corresponds to the first change made to data container 400 by transaction "7,3,8". Thus, transaction "738" made two updates to the data in data container 400. The undo record 418 contains a record 420 of the entry that was overwritten by entry 414.

Although the example depicts rollback entry 416 as having a physical pointer (undo pointer 410) that points to rollback entry 418, in certain embodiments, rollback entries do not actually contain a physical pointer to the undo record that contains the next most recent change information for the data container. Instead, each rollback entry contains a record of the entry that was overwritten in the transaction list of the data container by the entry for the transaction at issue. Therefore, by applying the undo information in an undo record, the corresponding undo pointer in the transaction list to pointer is automatically updated to point to the undo record having the next most recent change information. For example, by including information that indicates that the entry for rollback entry 418 was overwritten in the transaction list of the data container 400 by the entry for rollback entry 416, by applying the change information in rollback entry 416 the undo pointer 432 for entry 414 is automatically updated to point to rollback entry 418.

RECOVERY AFTER AN INSTANCE FAILURE

Figure 5A:
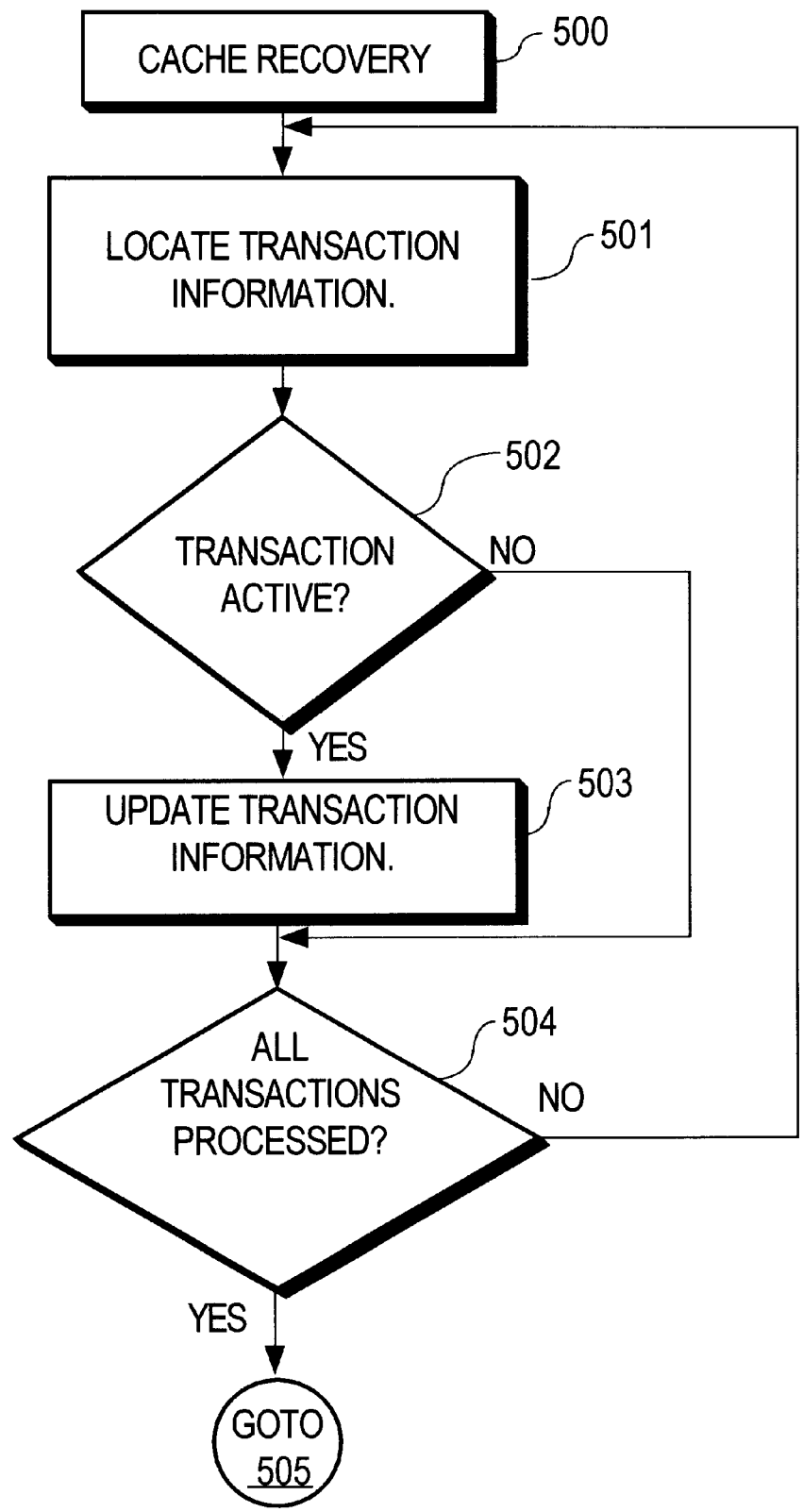
FIG. 5A is a portion of a flow chart illustrating a method for recovering after an instance failure in a database.
Figure 5B:
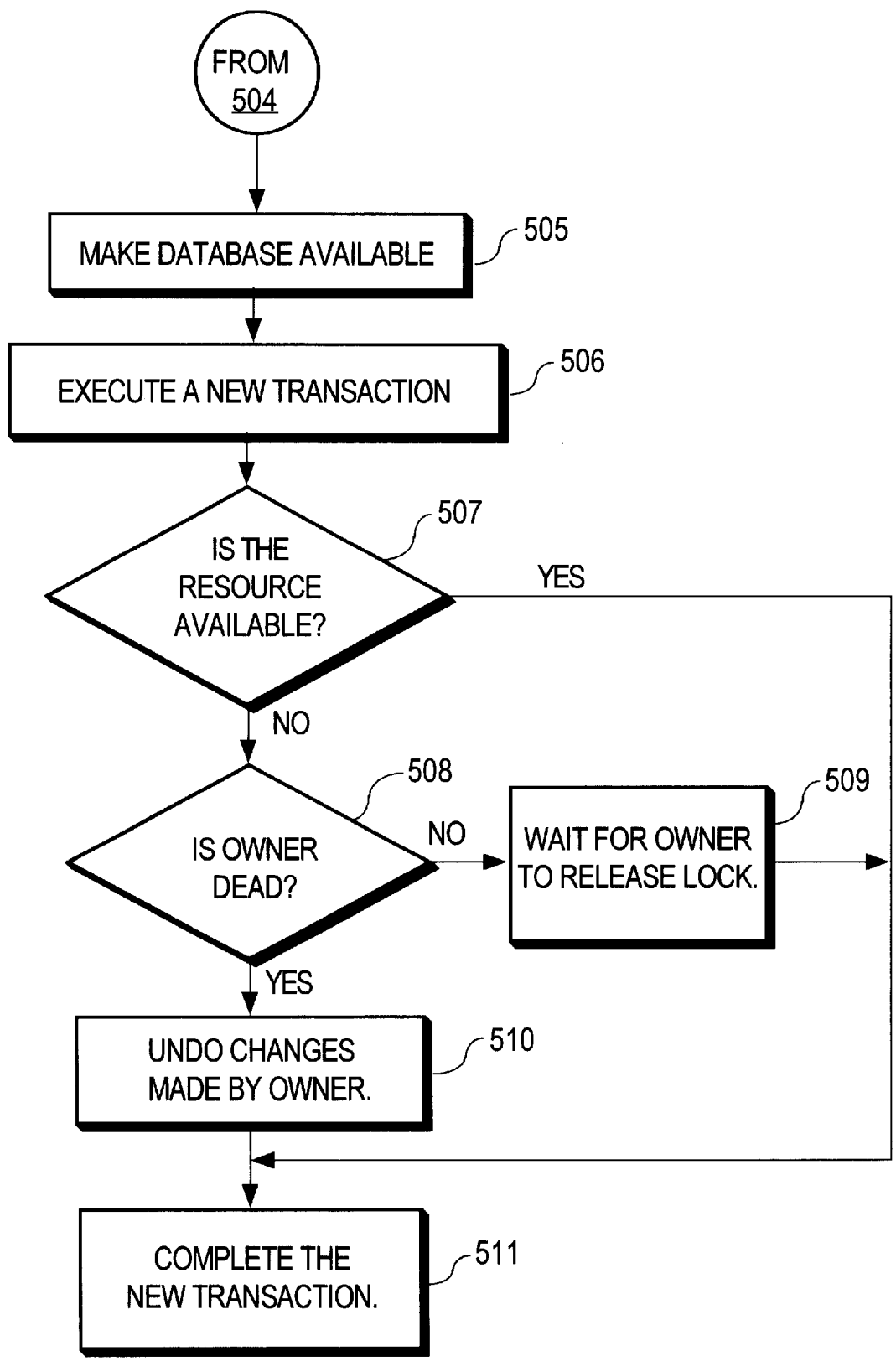
FIG. 5B is another portion of the flow chart illustrating a method for recovering after an instance failure in a database.

FIGS. 5A and 5B is a flowchart illustrating a method for recovering after an instance failure in a database. At step 500, cache recovery is performed. Cache recovery involves updating the database to reflect changes that had been made to cached blocks of data prior to the crash, but which had not yet been applied to the database at the time of the crash. As mentioned earlier, cache recovery typically involves applying a plurality of changes recorded in a redo log to data files in the database.

At step 501, transaction information that corresponds to a transaction associated with an instance that crashed is found. In one embodiment of the present invention, the transaction information is in the form of a transaction table such as the table illustrated in FIG. 3. The transaction table includes entries corresponding to transactions that existed in an instance. Finding transaction information corresponding to a transaction associated with an instance that crashed can be achieved by identifying a rollback segment associated with the instance that crashed. Once a rollback segment associated with the instance that crashed is identified, a transaction table in the rollback segment may be accessed.

At step 502, it is determined based on the transaction information whether the transaction associated with the instance that crashed was active. This determination can be achieved by reading status information in the transaction table. The status information will indicate whether the transaction was committed or active at the time of the instance failure. If the transaction was active when the instance crashed, then control proceeds to step 503. If the transaction was committed when the instance crashed, then control proceeds to step 504.

At step 503, the transaction information is updated to indicate that the transaction is dead. This can be achieved by setting a flag in a field of an entry that is associated with the transaction in the transaction table. For example, a bit may be set in the "DEAD" field of the transaction table entry that corresponds to the transaction (see FIG. 3).

At step 504, it is determined whether all the transactions are processed. If all the transactions are processed, control proceeds,to step 505. If not all the transactions are processed, control returns to step 501.

At step 505, the database is made available to the users. By making the database available to the users after updating the transaction information and before undoing any updates performed by the dead transaction, the present method for recovery allows the user to access data that was not affected by the instance crash almost.immediately after the crash. Thus, the users are not penalized by having to wait for the DBMS to recover data files which the users would otherwise not need to access.

At step 506, a new transaction is executed. When the new transaction requests access to a resource, it is determined whether the resource is available or unavailable (step 507). The resource will not be available if the resource is locked by another transaction. Determining whether a resource is available or unavailable can be achieved by checking the write lock indicator in the data section of a container. If the resource is unavailable, control proceeds to step 508. If the resource is available, control proceeds to step 511.

At step 508, it is determined whether the locked resource belongs to a dead transaction (i.e. a transaction that was active and uncommitted at the time of the crash). Determining whether a resource belongs to a dead transaction can be achieved by first checking the transaction list of the container that corresponds to the resource, such as container 400 illustrated in FIG. 4, to determine the identity of the owner of the resource. Once the owner of the resource is identified, transaction information corresponding to the owner (e.g. the transaction table entry for the owner) is found to determine whether the owner is a transaction which is dead. If the resource belongs to an owner that is not dead, control proceeds to step 509. If the resource belongs to an owner that it is dead, control proceeds to step 510.

At step 509, control proceeds to wait for the resource to be made available. When the current owner of the resource completes, the lock on the resource will be released.

At step 510, the new transaction makes the resource available (unlocks the resource) by undoing some or all of the changes made by the dead transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released. In certain embodiments, to undo the changes, the new transaction follows the block-based undo chain, applying each undo record encountered. Once all of the undo records associated with the dead transaction that are in the block-based undo chain, have been applied, the lock on the resource will be freed and the resource will be available to the new transaction. Control then proceeds to step 511.

At step 511, the new transaction accesses the resource and completes the transaction.

RECOVERY AFTER A TRANSACTION FAILURE

Figure 6:
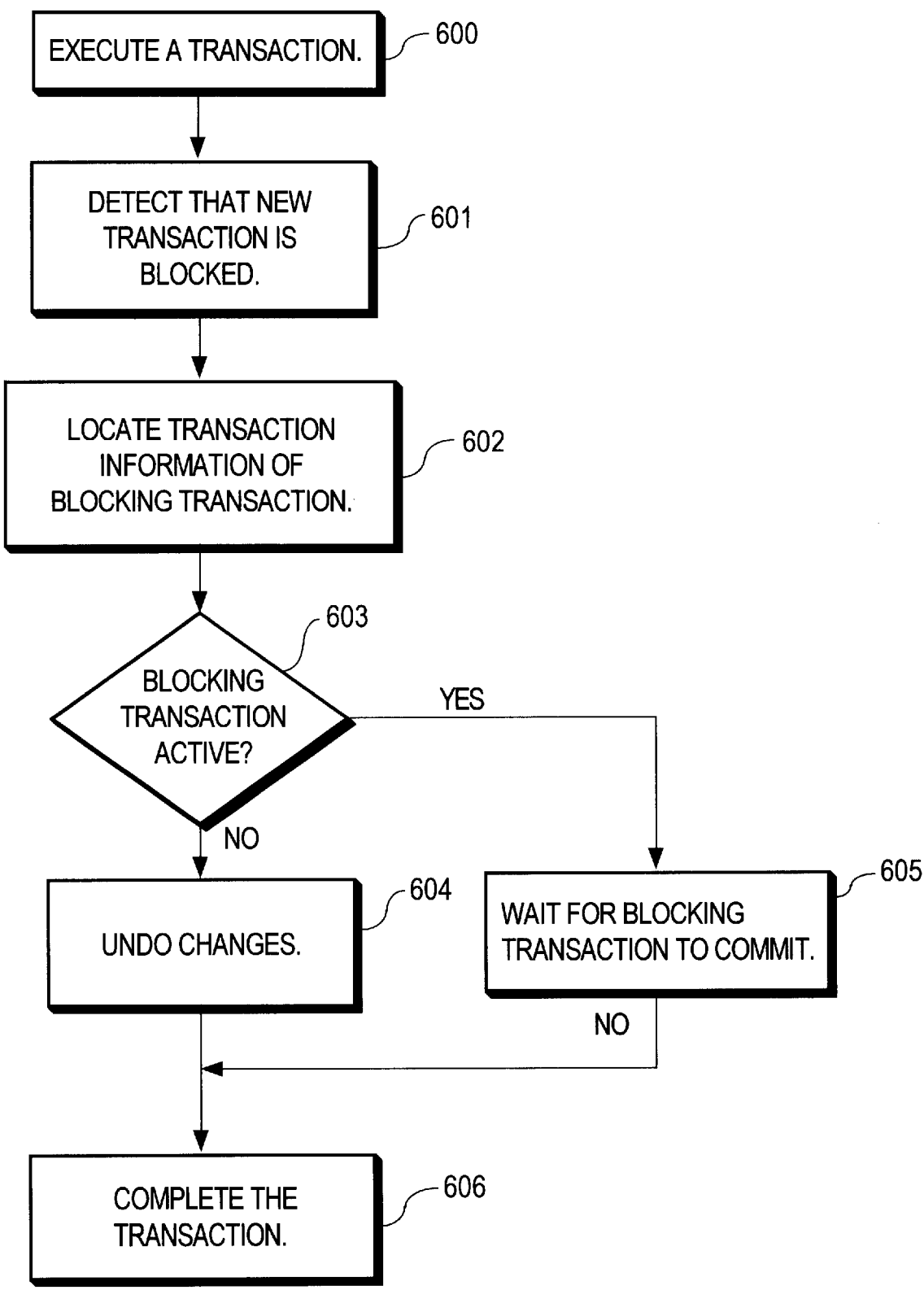
FIG. 6 is a flow chart illustrating a method for recovering after a transaction failure in a database.

FIG. 6 is a flowchart illustrating a method for recovering after a transaction prematurely terminates. These steps may be performed when a new transaction attempts to access a resource that is held by another transaction. At step 600, a new transaction is executed.

At step 601, the system detects that a new transaction is blocked. The detection is achieved when the new transaction attempts to access a resource held by another transaction.

At step 602, transaction information that corresponds to the blocking transaction is found. In one embodiment of the present invention, the transaction information is in the form of an entry in a transaction table such as the table 310 illustrated in FIG. 3. As explained above, the transaction table 310 includes entries, each of which corresponds to and reflects the current state of a transaction in an instance.

At step 603, it is determined, based on the transaction information, whether the blocking transaction is an active transaction or a dead transaction. This determination can be achieved by reading status information in the transaction table and gaining access to a memory structure indicating whether the transaction is still alive. The status information will indicate whether the transaction is active or committed. According to one embodiment, a dead status is indicated by an active status flag in a transaction table of an instance that crashed. If the transaction is dead, then control proceeds to step 604. If the transaction is not dead, then control proceeds to step 605.

At step 604, the new transaction undoes some or all of the changes made by the blocking transaction, including those changes which caused the resource to be locked. To undo the changes, the new transaction retrieves a location of one or more undo records for the transaction which locked the resource. After the undo records are retrieved, the operations specified in the undo records are executed and the lock to the resource is released. In certain embodiments, a block level recovery mechanism is used to apply only those undo records of a dead transaction that correspond to the particular block of interest. The block level recovery mechanism will be described in greater detail below.

At step 605, the system waits for the blocking transaction to commit.

At step 606, the new transaction accesses the resource and completes the transaction.

BLOCK LEVEL RECOVERY OVERVIEW

A drawback with undoing change s at the transaction level is that when a new transaction encounters a resource (e.g. data block or a row in a data block) that is currently held by a dead transaction, the new transaction may be required to wait for undo changes to be applied which correspond to resources (data blocks) that are not of interest to the new transaction. However, by connecting the undo records in block-based undo chains, when a new transaction encounters a resource (e.g. a rowlock on a row in a particular data block) that is currently held by a dead transaction, a block level recovery mechanism can be used to apply only those undo records of a dead transaction that correspond to the particular resource (data block) of interest. By using the block level recovery mechanism, a particular resource (data block) can be recovered and made available for use without having to apply undo records that correspond to changes in resources (data blocks) that are not of interest to the new transaction.

Figure 7:
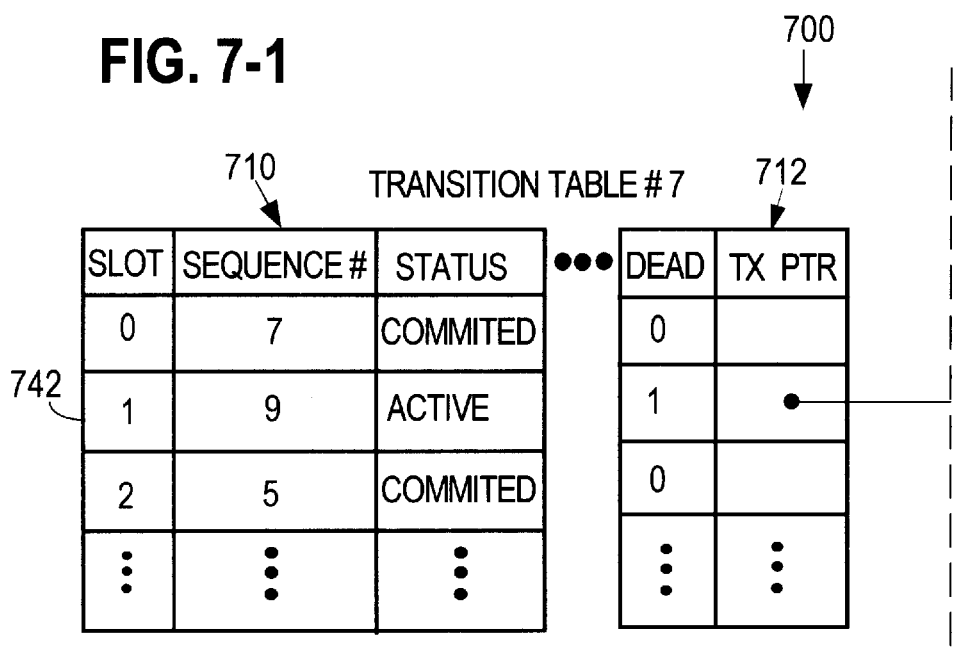
FIG. 7 illustrates an example of a system for performing block level recovery in accordance with an embodiment of the invention.
Figure 1:
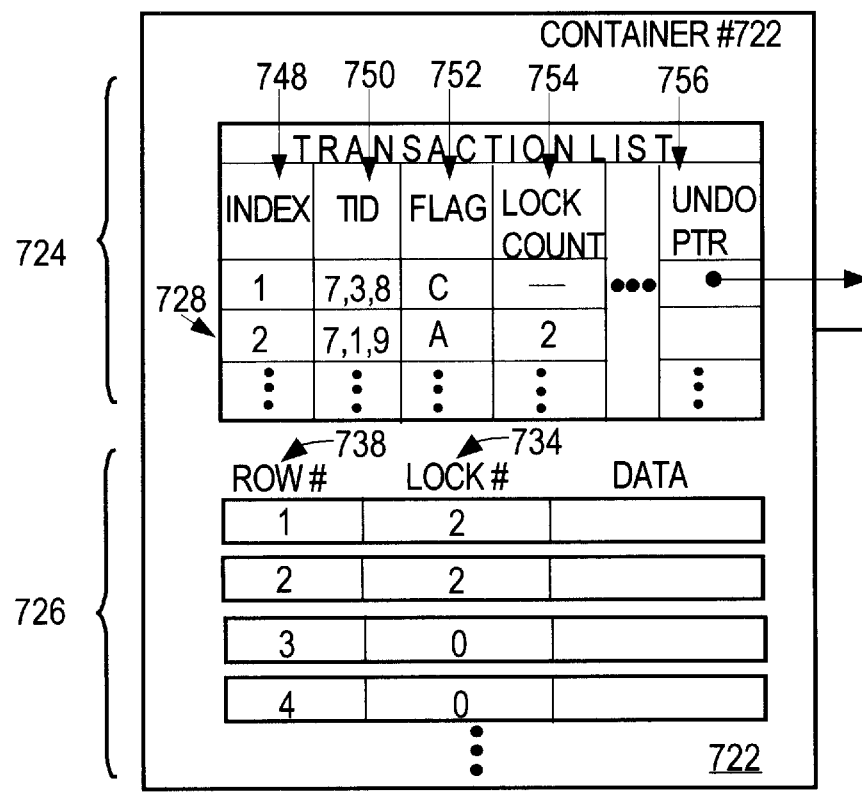
Figures 2, 7:
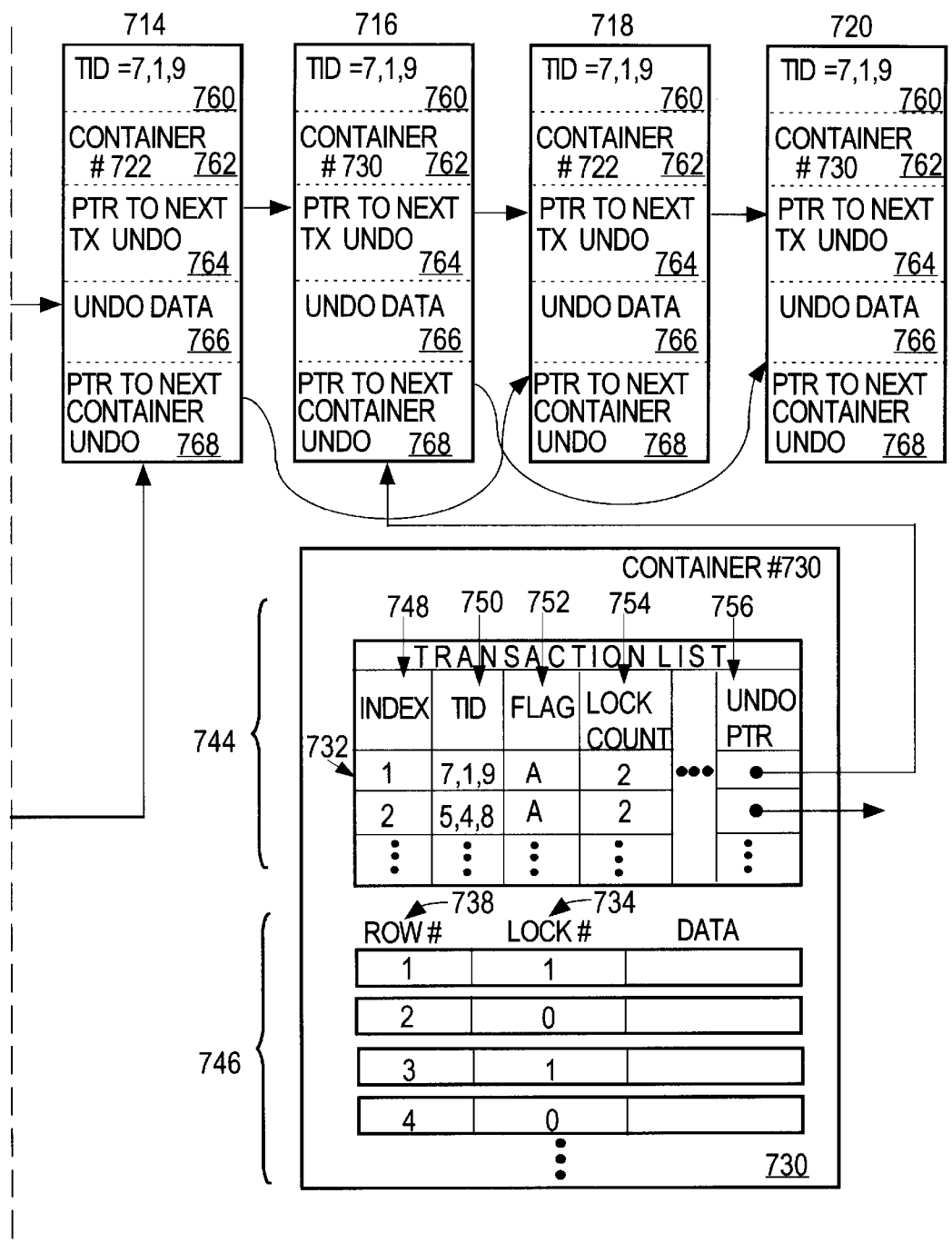

FIG. 7 illustrates an example of a system 700 for performing block level recovery in accordance with an embodiment of the invention. As depicted, system 700 contains a transaction table 710, data containers 722 and 730, and a plurality of undo blocks 714, 716, 718 and 720.

In this example, each undo block contains a single undo record. Also as depicted in this example, each undo record contains undo changes that reflect changes made to a single data container. However, in certain embodiments, an undo block may contain multiple undo records. In addition, different undo records within a single undo block may reflect changes made to different data containers.

Typically, the undo changes within a given undo record will reflect changes that were made to a single data container. However, as will be described in greater detail hereafter, the changes that are initially made to a single data container may later migrate to multiple data containers due to the split of data containers. Consequently, at the time the changes need to be undone, the changes contained in a particular undo record may contain changes that, at the time of recovery, correspond to more than one data container.

Transaction table 710 includes a plurality of transaction-based undo chain pointers 712 (TX PTR) that are each associated with a particular transaction entry in transaction table 710. Each transaction-based undo chain pointer 712 points to the head of a chain of undo records that correspond to changes made by the transaction associated with the pointer. In this example, the TX PTR for entry 742 points to a transaction-based undo chain for transaction "7,1,9". The chain begins with the undo block 714 that contains the undo record for the last change made by transaction "7,1,9". The chain ends with the undo block 720 that contains the undo record for the first change made by transaction Data containers ,722 and 730 respectively include transaction list sections 724 and 744 and data sections 726 and 746. Transaction list section 724 includes entries that identify transactions that have modified data container 722 and transaction list section 744 includes entries that identify transactions that have modified data container 730. The transaction list sections (724 and 744) contain an entry for each transaction that is actively updating the corresponding data container.

Each entry includes an index number 748, a transaction ID 750, a status flag 752, a lock count indicator 754, and an undo pointer 756. When an active transaction obtains a write lock on a row, a persistent row lock is maintained on the row until the transaction either commits or is rolled back.

The undo pointer 756 for each entry points to head of a block-based undo chain. At the head of the block-based undo chain is an undo record that indicates how to undo the most recent change made to the container by the corresponding transaction. Although a transaction list section may contain entries for multiple transactions that are concurrently updating the corresponding container, no two entries in a particular transaction list section can simultaneously contain rowlocks for the same row. No two transactions can make changes to the same row of the same container at the same time.

In should be noted, that although the examples illustrate locks being held at the row level, the invention is not limited to any particular granularity of locks. For example, in certain embodiments, individual objects within a row can be locked. To unlock the individual objects, information in the undo records that correspond to the locked object is applied to the associated data block.

The data section of each container includes rows of data that are identified by row numbers 738. A portion of each row is used as a write lock indicator 734 to indicate whether a particular row is currently write locked. In the preferred embodiment, the write lock indicator 734 contains a number that indicates the particular entry in the transaction list belonging to the transaction that holds the lock on the row in question. For example, row 1 of data container 730 is currently locked by transaction list entry 732.

The undo records in undo blocks 714, 716, 718 and 720 include a transaction ID 760, a block number 762, a next tx undo pointer 764, undo information 766 and a pointer to next container undo 768. The transaction ID 760 identifies the transaction which performed the operation that corresponds to the undo record. The container number 762 identifies the container on which the operation was performed.

In certain embodiments, the container number 762 is an index to one or more block keys that identify a list of containers for which undo changes reside in the undo record. In certain embodiments, the container number 762 in an undo record is an index to one or more block keys. The block keys identify a particular row in a particular container for which undo changes reside in the undo record. The undo information 766 contains data necessary for undoing the changes that were performed on the identified container by the identified transaction.

The next tx undo pointer 764 points to the undo block that contains the next undo record in the transaction-based undo chain. The next undo block in the transaction-based undo chain is the undo block that contains the undo record for undoing the previous change that was made by the same transaction. As depicted, each undo block that contains changes made by the same transaction is linked in this manner to form the transaction-based undo chain.

In this example, the transaction-based undo chain pointer associated with entry 742 in the transaction table 710, is used to connect to the head of the transaction-based undo chain (the undo record in undo block 714) which represents the most recent changes made by transaction "7, 1, 9". At the other end of the transaction-based undo chain is the undo block 720 that contains the undo record that corresponds to the first change made by transaction "7, 1, 9". Because the undo record in undo block 720 corresponds to the first change made by transaction "7, 1, 9", its next tx undo pointer 764 does not connect to another undo record.

The pointer to next container undo 768 points to the undo record that contains undo changes for undoing a previous change, if any, made to the same container by the same transaction. Each change made to the container by a particular transaction is linked in this manner to form the block-based undo chain of undo records.

The undo pointer 756 in each entry of transaction list sections 724 and 744 point to the undo record that represents the most recent change to the container that was made by the entry's corresponding transaction. In this example, the undo pointer for entry 728 of container 722 points to the undo record in undo block 714 which contains the most recent change that was made to the block (container 722) by the identified transaction (i.e. 7,1,9). Also illustrated in this example, the undo pointer for entry 732 of container 730 points to the undo record in undo block 716 which contains the most recent change that was made to the block (container 730) by the identified transaction (i.e. 7,1,9). The undo record thus identified constitutes the head of a block-based undo chain.

At the other end of each block-based undo chain is the undo record that corresponds to the first change that was made to the container by the corresponding transaction. The undo record that corresponds to the first change made to a container by a particular transaction does not contain a pointer to an undo record for an earlier change to the container by the same transaction, since there can be no change earlier than the first change. Rather, the undo record that corresponds to the first change made by a transaction to a container contains undo information that is used to reconstruct the entry that was overwritten in the transaction list by the entry for the transaction at issue.

In the illustrated example, the entries 728 and 732 correspond to the transaction identified by the transaction ID "7,1,9". The undo pointer in entry 728 points to the undo record in undo block 714 which contains the last change made to data container 722 by transaction "7,1,9". The undo pointer in entry 732 points to the undo record in undo block 716 which contains the last change made to data container 730 by transaction "7,1,9". The pointer to next container undo 768 of the undo record in undo block 714 points to the undo record in undo block 718 which corresponds to the first change made to data container 722 by transaction "7,1,9". The pointer to next container undo 768 of the undo record in undo block 716 points to the undo record in undo block 720 which corresponds to the first change made to data container 730 by transaction "7,1,9". Thus, in this example, transaction "719" performed two separate updates (i.e. atomic changes) to the data in data container 722 and 730.

PERFORMING BLOCK LEVEL RECOVERY

Figure 8:
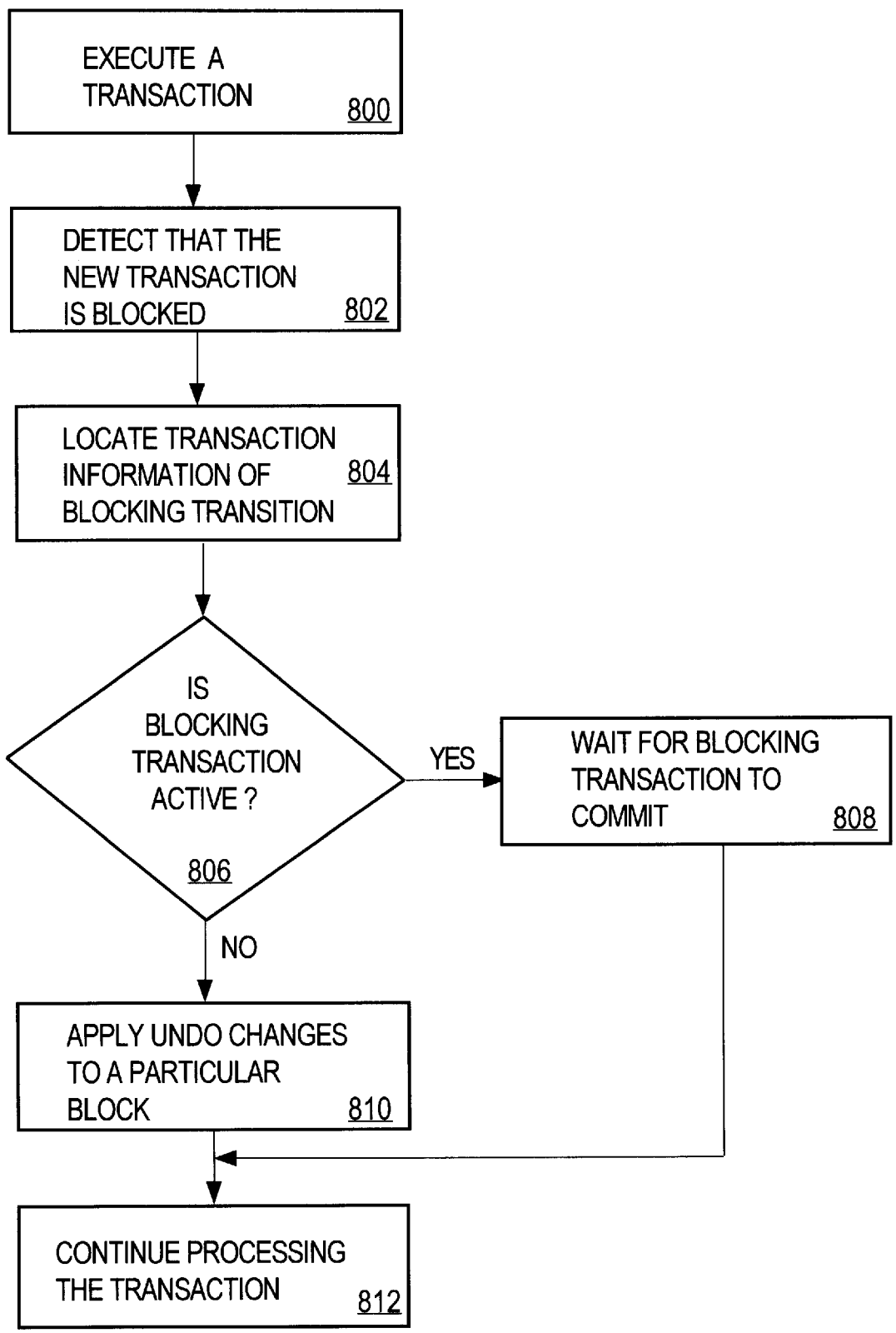
FIG. 8 is a flow diagram illustrating a method for performing a block level recovery after a transaction prematurely terminates.

FIG. 8 is a flow diagram illustrating a method for performing a block level recovery after a transaction prematurely terminates. These steps may be performed when a new transaction attempts to access a resource that is held by another transaction. In this example, it shall be assumed that the new transaction has attempted to access information contained in row 1 of container 730.

At step 800, a new transaction is executed. At step 802, the system detects that the new transaction is blocked. In this example, the detection is achieved when the new transaction attempts to access information contained in container 730 which is held by another transaction.

At step 804, transaction information that corresponds to the blocking transaction is found. In one embodiment of the present invention, the transaction information is in the form of an entry in a transaction table such as entry 742 in transaction table 710. As explained above, the transaction table 710 includes entries, each of which corresponds to and reflects the current state of a transaction in an instance.

At step 806, it is determined, based on the transaction information, whether the blocking transaction is an active transaction or a dead transaction. In certain embodiments, this determination is achieved by reading status information in the transaction table and gaining access to a memory structure indicating that the transaction is still alive. The status information will indicate whether the transaction is active or committed. In certain embodiments, the dead field in the transaction table entry is checked to determine if the transaction is still alive. In an alternative embodiment, a dead status is indicated by an active status flag in a transaction table of an instance that is known to have crashed. If the transaction is dead, then control proceeds to step 810.

If the transaction is active, at step 808, the system waits for the blocking transaction to release the lock. Control then proceeds to step 812.

At step 810, the new transaction undoes the changes to the particular container that is held by the blocking transaction. To undo the changes, the new transaction retrieves the undo records that contain changes to the particular container that is held by the dead transaction. After the undo records are retrieved, the operations specified in the undo records are executed and the lock on the container is released. In certain embodiments, each undo record contains an applied flag that indicates whether the undo changes in an undo record have been applied to the corresponding container. When the changes contained in an undo record are applied to the appropriate container, the corresponding applied flag is updated to indicate that the changes have been applied.

One advantage of maintaining an applied flag for each undo record is that it enables other recovery processes to know that a particular undo record has already been applied so that they will not reapply the undo record. This is particularly important, for example, when recovery is being performed concurrently on a block-level basis and some other basis. For example, a background process may be performing undo on a transaction level basis. During transaction-based recovery, a dead transaction is identified and undo records in the transaction-based undo chain for the dead transaction are applied in order. During the transaction-based recovery, undo records that have previously been applied by block-level recovery (as indicated by the applied flag) are skipped. During block-level recovery, undo records that have previously been applied during transaction-based recovery are skipped.

In this example, the undo pointer associated with entry 732 of container 730 is used to locate the undo record in undo block 716 which contains the most recent change to container 730 by the blocking transaction. The operations specified in the undo record of undo block 716 are then applied to container 730. After the specified undo operations are applied, the applied flag of the undo record in undo block 716 is set to indicate that the undo record has been applied.

The undo pointer associated with entry 732 is then updated using the pointer to next container undo 768 of undo record in undo block 716 to point to the undo record that contains the next most recent change to container 730. In certain embodiments, the undo pointer associated with entry 732 is automatically updated by applying the changes in the undo record in undo block 716. In this example, the undo pointer associated with entry 732 is updated to point to the undo record in undo block 720.

Each undo record in the block-based undo chain is applied in the same fashion. Thus, after applying the undo record in undo block 716, then next undo record in the block-based undo chain is processed. In the present example, the next undo record in the block-based undo chain is the undo record in undo block 720. Therefore, the operations contained in the undo record of undo block 720 are applied to container 730. Because the undo record in undo block 720 is the last undo record in the block-based undo chain, applying the undo record causes the lock held on container 730 by the dead transaction 742 to be released.

At step 812, the new transaction accesses the container and continues processing the transaction.

ROW LEVEL RECOVERY OVERVIEW

In certain embodiments, a row level recovery mechanism is used to perform recovery on a row level basis. Using the row level recovery mechanism, when a new transaction encounters a lock on data contained in a particular resource (e.g. row of a container), the new transaction causes only those changes in the undo records that correspond to the particular resource (row of the container) to be applied. Thus, using the row level recovery mechanism, a particular resource (row of data in a data container) can be recovered without first having to apply undo changes that correspond to resources (rows) that are not of interest to the new transaction. Recovering at the row level can be achieved since only one transaction can obtain a write lock on a particular row in a particular container at any one time.

Figure 9:
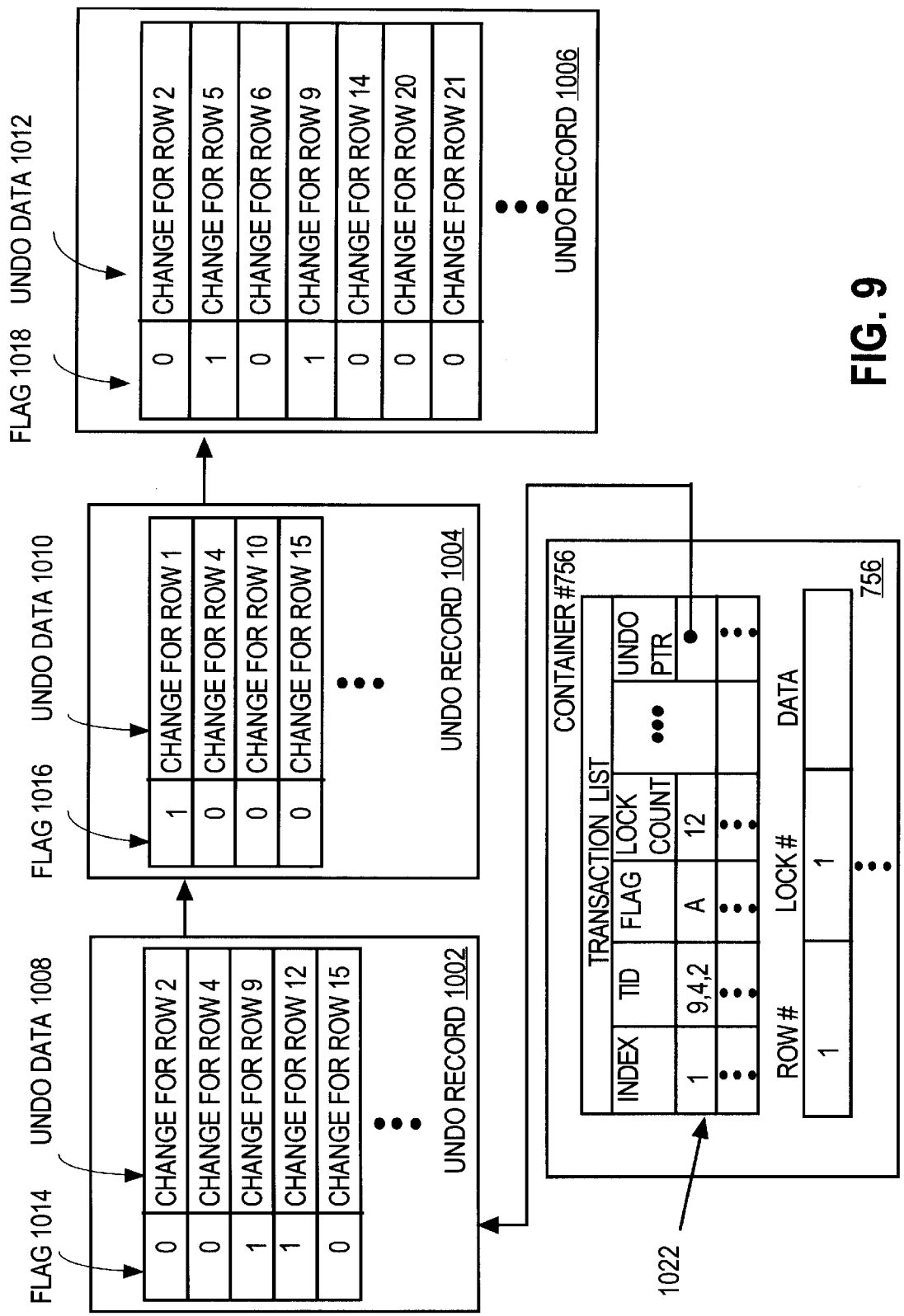
FIG. 9 illustrates a system in which row level recovery can be performed according to an embodiment of the invention.

FIG. 9 illustrates three undo records 1002, 1004 and 1006 associated with a "container 756" in which row level recovery can be performed according to an embodiment of the invention. For explanation purposes, only the undo data 1008, 1010 and 1012 and flags 1014, 1016 and 1018 are depicted in undo records 1002, 1004 and 1006. As illustrated, undo data 1008, 1010 and 1012 contain undo changes for different rows in "container 756". Although the changes contained in an undo record represent changes that were performed as an atomic unit of work, in certain embodiments, the changes for a particular row can be applied independent of one another. For example, the change for row 4 in undo data 1008 can be applied without applying the change to row 9 of undo data 1008.

Figure 10:
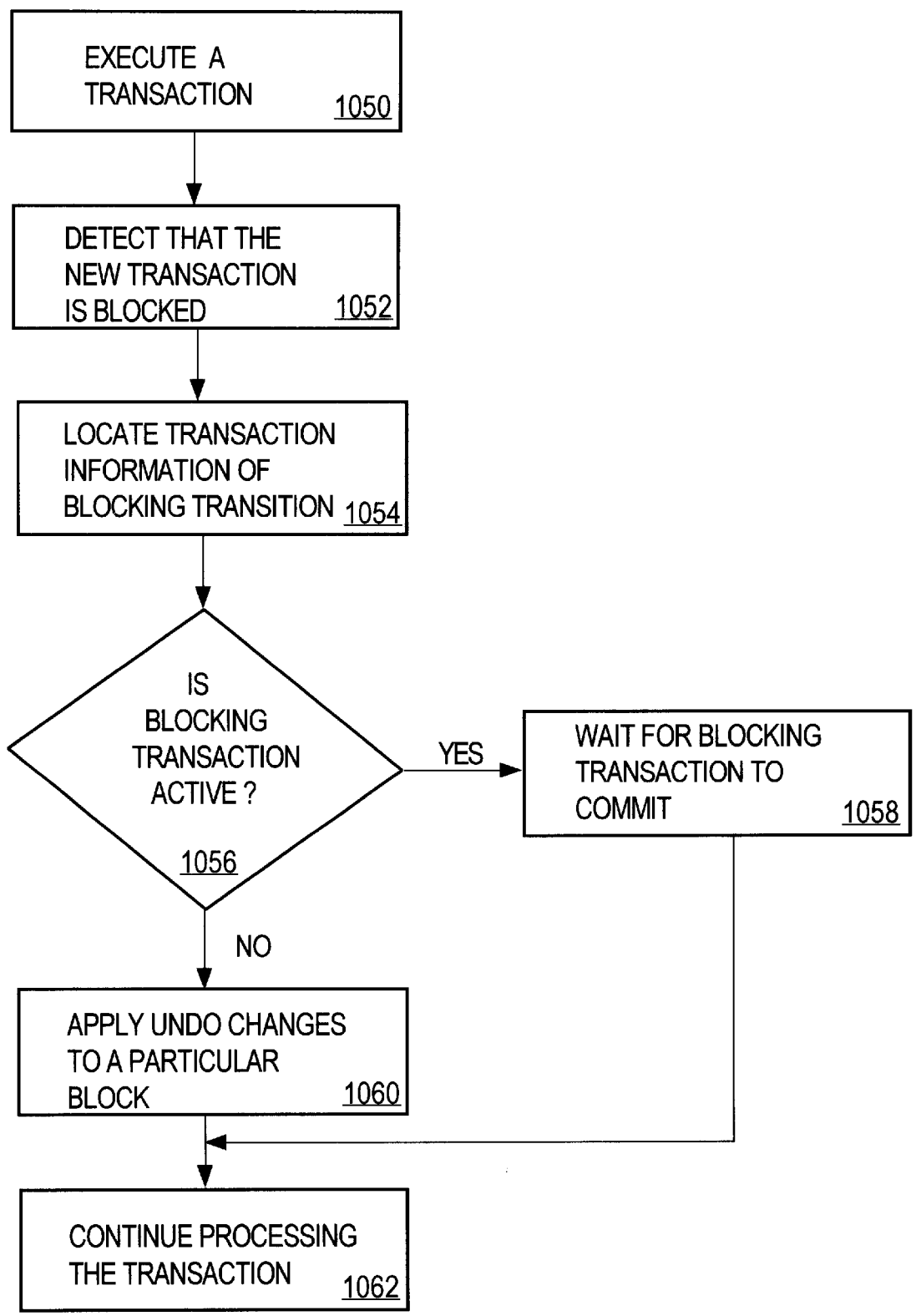
FIG. 10 is a flow diagram illustrating a method for performing row level recovery after a transaction prematurely terminates.

FIG. 10 is a flow diagram illustrating a method for performing a row level recovery after a transaction prematurely terminates. These steps may be performed when a new transaction attempts to a access a particular row in a container that is held by another transaction. In this example, it shall be assumed that the new transaction has attempted to access information contained in row 9 of container 756.

At step 1050, a new transaction is executed. At step 1052, the system detects that a new transaction is blocked. In this example, the detection is achieved when the new transaction attempts to access information contained in row 9 of container 756 which is held by another transaction.

At step 1054, transaction information that corresponds to the blocking transaction is found. In one embodiment of the present invention, the transaction information is in the form of an entry in a transaction table within the container which contains the row of interest.

At step 1056, it is determined, based on the transaction information, whether the blocking transaction is an active transaction or a dead transaction. In certain embodiments, this determination is achieved by reading status information in the transaction table and gaining access to a memory structure indicating that the transaction is still alive. The status information will indicate whether the transaction is active or committed. According to one embodiment, a dead status is indicated by an active status flag in a transaction table of an instance that crashed. If the transaction is dead, then control proceeds to step 1060.

If the transaction is active, then at step 1058, the system waits for the blocking transaction to release its lock. Control then proceeds to step 1062.

At step 1060, the new transaction undoes the changes to the particular row of the container that is held by the blocking transaction. To undo the changes, the new transaction retrieves the undo records that contain changes for the particular row that is locked by the blocking transaction. After the undo records are retrieved, the operations that correspond to the particular row of interest are executed and the lock on the particular row is released. In certain embodiments, each undo record contains an applied flag for each change that was made to a particular row. The applied flags indicate whether changes contained in an undo record for a particular row have previously been applied to the corresponding container. Once the changes contained in an undo record for the particular row has been applied, the corresponding applied flag is set to indicate the changes have been applied.

In this example, the undo pointer associated with entry 1022 of container 756 is used to locate the undo record 1002 which contains the most recent changes to container 756 that were caused by the blocking transaction. The operations in undo record 1002 are then checked to determine if they contain changes that correspond to the particular row of interest (row 9). In this example, undo record 1002 contains a change that corresponds to the particular row of interest (row 9). The operations contained in the changes for row 9 are then applied and the applied flag is updated to indicate that the changes to row 9 have been applied in undo record 1002.

The prior block change pointer of undo record 1002 is then used to access undo record 1004 which contains the next most recent changes to container 756. In this example, the undo record 1004 does not contain changes that correspond to the particular row of interest (row 9). Therefore, the prior block change pointer of undo record 1004 is used to access undo record 1006 which contains the next most recent changes to container 756.

In this example, undo record 1006 contains a change that corresponds to the particular row of interest (row 9). The operations contained in the changes for row 9 are then applied. Because undo record 1006 is the last undo record associated with container 756 for entry 1022, row 9 of container 756 has been recovered.

At step 1062, the new transaction accesses the resource and continues processing the transaction.

Although the previous examples have illustrated recovering a resource at the block and row levels, according to certain embodiments, recovery is performed at the object level. For example, in certain embodiments locks are held on a per object level. Thus, a dead transaction may hold a lock on a particular object within a row of a data block. If a new transactions requires access to the particular object, the object lock held by the dead transaction is removed by applying only the undo record information that necessary to release the particular object lock within row of the data block.

ROW MIGRATION

In certain cases, rows of data within a first container can migrate into a second container. For example, the rows of a particular container used as a node of a B-tree index may be split into two separate containers during re-balancing of the index. This tends to complicate recovery operations, because the data container that was changed to generate an undo record is not necessarily the same data container to which the undo record must be applied during recovery.

Figures 2, 11:
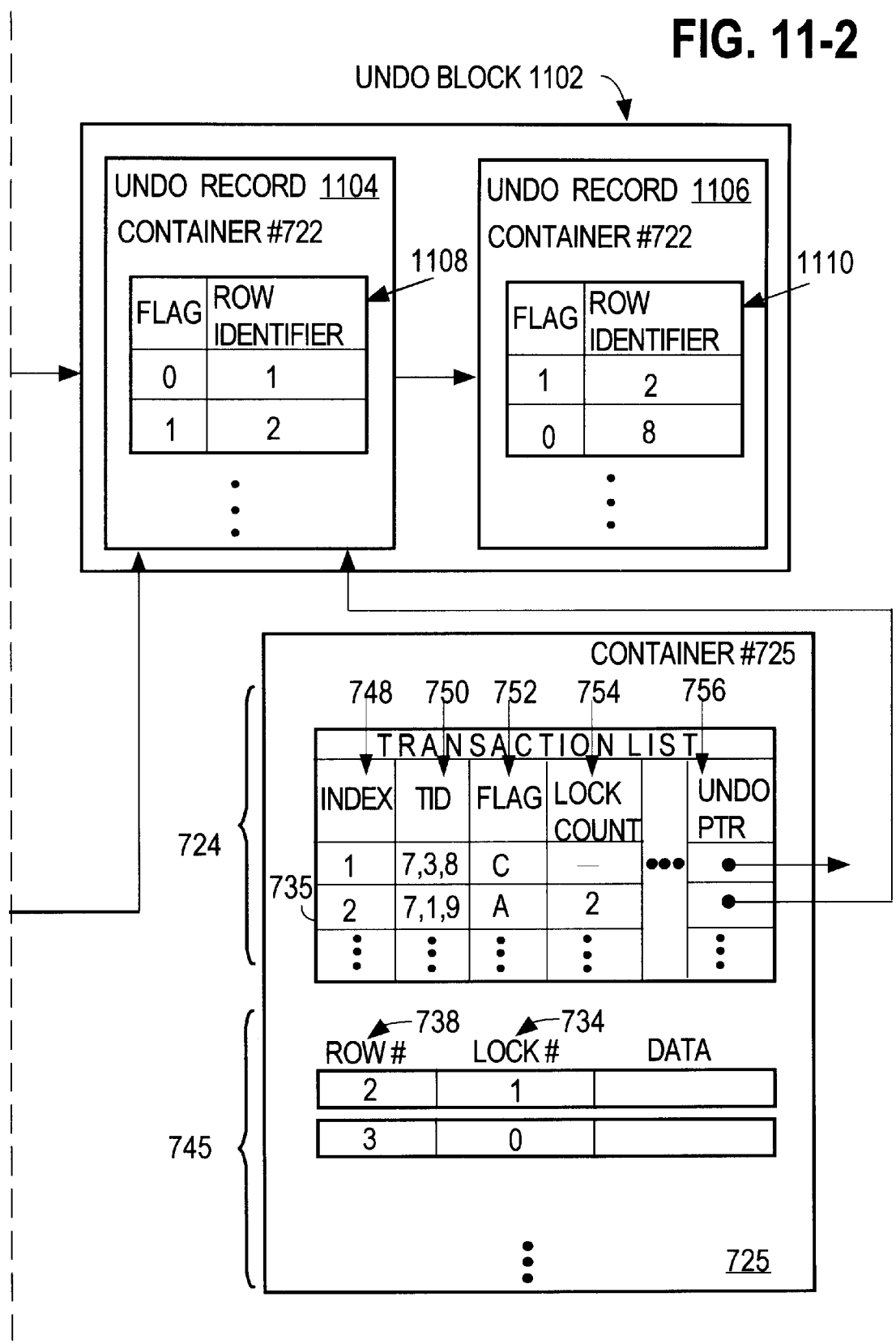
FIG. 11 depicts a system which illustrates the migration of rows from a first block into a second in accordance with an embodiment of the invention.

When a row migrates from a first container to second container, the information in the transaction list section of the first container is copied into the second container. For example, FIG. 11 depicts the migration of two rows from container 722 to container 725. In migrating the rows, transaction list section 724 in container 722 is copied into container 725. By copying the transaction list information from the first container into the second container, block level recovery can be performed on both containers, as shall be described in greater detail with reference to FIG. 11.

In certain embodiments, a row identifier list is maintained in each undo record. The row identifier list of an undo record identifies the rows that are associated with the changes in the undo record. For example, a row identifier list 1108 is maintained in undo record 1104. Row identifier list 1108 contains entries that indicate that rows "1", "2" and "3" are associated with the changes in the undo record 1104. In certain embodiments, applied flags are maintained in each undo record and are used to indicate whether changes for a particular row have been applied.

FIG. 11 depicts a system 1100 which illustrates the migration of rows from a first container into a second in accordance with an embodiment of the invention. FIG. 11 is similar to FIG. 7 and therefore like components have been numbered alike.

As shown in FIG. 11, rows 2 and 3 in data section 726 of container 722 have migrated to data section 745 of container 725. Translation list selection 724 has been copied from container 722 into container 725. In this example, an undo block 1102 contains two undo records 1104 and 1106. The undo pointer of entry 728 in container 722 and the undo pointer of entry 735 of container 725 both point to undo record 1104 which contains the most recent changes made by transaction "7,1,9" to both containers 722 and 725. Undo records 1104 and 1106 are respectively associated with row identifier lists 1108 and 1110. The row identifier lists 1108 and 1110 identify a list of rows for which undo changes reside in undo records 1104 and 1106, respectively.

For example, row identifier list 1108 indicates that the undo information contained in undo record 1104 applies to rows "1", "2" and "3". Similarly, the row identifier list 1106 indicates that the undo information contained in undo record 1104 applies to rows "2" and "8".

In certain embodiments, a bitmap is associated with an undo record and is used to indicate whether changes within the undo record have been applied to corresponding rows. Each time an undo change is applied to a particular row, the bitmap is updated to identify the changes have been applied to the particular row. In the illustrated embodiment, an applied flag that is used to indicate whether the undo changes in the undo record have been applied to a particular row is associated with each entry in row identifier lists 1108 and 1110.

Figure 12:
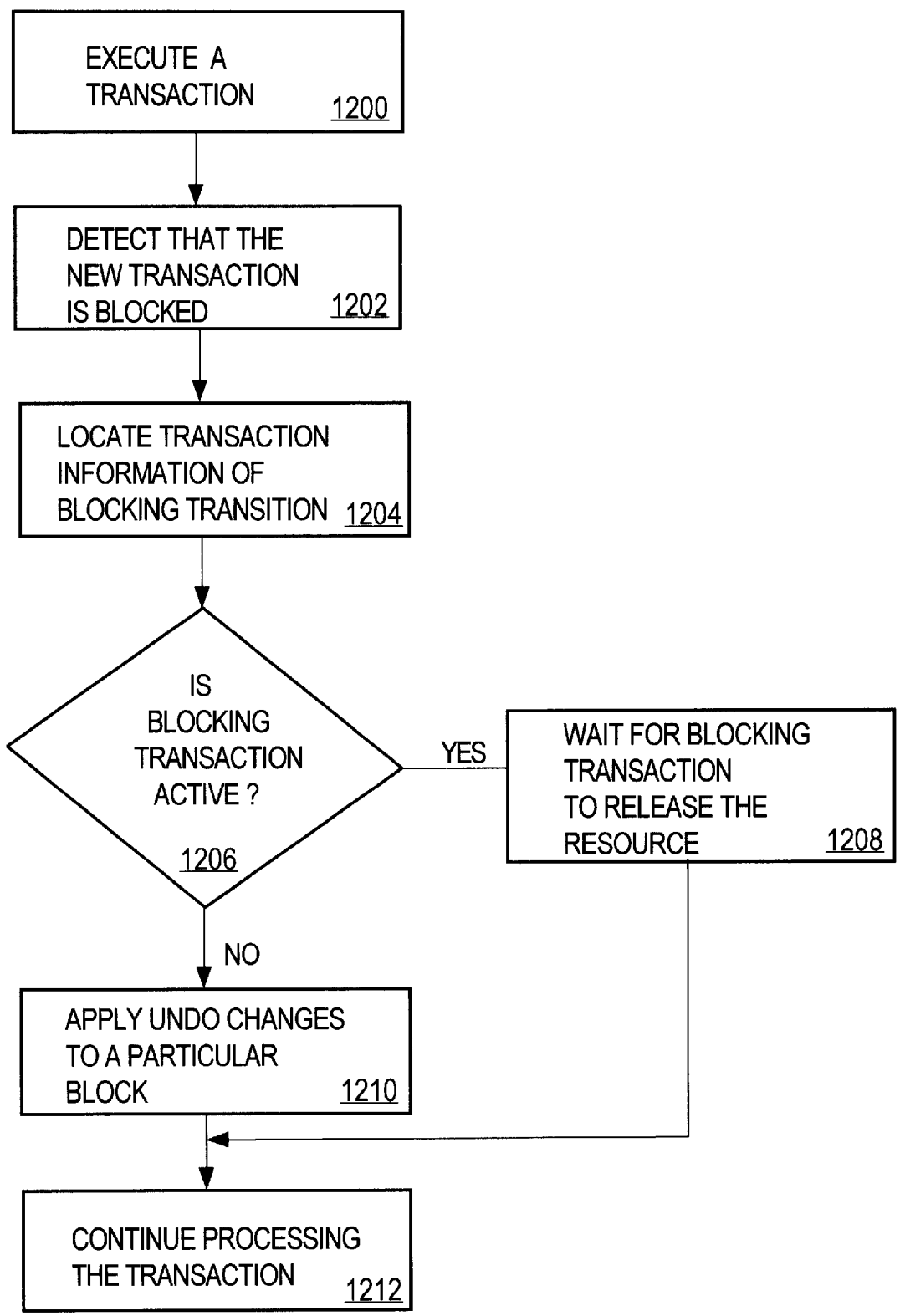
FIG. 12 is a flow diagram illustrating a method that allows for recovering after a row migrates from one block to another in accordance with an embodiment of the invention.

FIG. 12 is a flow diagram illustrating a method for performing a block level recovery after the migration of rows from one container to another in accordance with an embodiment of the invention. In this example, it shall be assumed that that rows 2 and 3 have migrated from container 722 into container 725 and that a new transaction has attempted to access information in row 2 after row 2 migrated to container 725. It shall also be assumed that changes for row 2 are contained in both undo record 1104 and 1106.

At step 1200, a new transaction is executed. At step 1202, the system detects that a new transaction is blocked. In this example, the detection is achieved when the new transaction attempts to access information in row 2 of container 725 which is held by another transaction.

At step 1204, transaction information that corresponds to the blocking transaction is found. In one embodiment of the present invention, the transaction information is in the form of an entry in a transaction table such as entry 742 in transaction table 710. As explained above, the transaction table 710 includes entries, each of which corresponds to and reflects the current state of a transaction in an instance.

At step 1206, it is determined, based on the transaction information, whether the blocking transaction is an active transaction or a dead transaction. This determination can be achieved by reading status information in the transaction table and gaining access to a memory structure indicating that the transaction is still alive. The status information will indicate whether the transaction is active or committed. According to one embodiment, a dead status is indicated by an active status flag in a transaction table of an instance that crashed. If the transaction is dead, then control proceeds to step 1210.

If the transaction is active, at step 1208, the system waits for the blocking transaction to release its lock. Control then proceeds to step 1212.

At step 1210, the new transaction undoes the changes to the particular container that contains the row that is held by the blocking transaction. To undo the changes, the new transaction retrieves the undo record that contains the most recent changes for the particular data container that contains the row held by the blocking transaction ("container of interest"). After the undo record is retrieved, the row identifier list of the undo record is used to identify the changes (rows) that are associated with the container of interest. The changes for the rows associated with the container of interest are then applied to the container of interest.

In certain embodiments, an applied flag is associated with each row in the row identifier list that is used to indicate whether the changes in the undo record have been applied to a particular row of a particular container. Once the changes contained in an undo record have been applied, the corresponding flags are set to indicate that the changes have been applied. The pointer to the next container undo is then used to obtain a previous undo record if it exists. If a previous undo record exists, the sequence is repeated for that container.

In this example, the undo pointer 756 in entry 735 of transaction list sections 724 is used to locate undo record 1104 which contains the most recent changes to the container 725. The rows in the row identifier list 1108 are then compared with the rows in container 725 to identify the changes that need to be applied to container 725. In this example, because rows 2 and 3 have migrated to container 725, rows 2 and 3 are identified as residing in container 725. Therefore, the undo changes in undo record 1104 for rows 2 and 3 are applied to container 725 and the corresponding flags are updated to indicate that the changes have been applied.

The prior block change pointer is then used to update the undo pointer associated with entry 735 in container 725 to access undo record 1106. However, the undo pointer associated with entry 728 in container 722 is not updated as the changes in undo record 1104 that correspond to container 722 have not yet been applied.

The rows in the row identifier list 1110 are then compared with the rows in container 725 to identify the changes that need to be applied to container 725. In this example, row 2 is identified as residing in both container 725 and row identifier list 1110. Therefore, the undo changes in undo record 1110 for rows 2 are applied to container 725 and the corresponding flag is updated to indicate that the changes have been applied. In this example, because there are no other undo records associated with container 725, all undo changes for row 2 have been applied and therefore the lock held by the dead transaction on row 2 can be removed.

At step 1212, the new transaction accesses the resource and continues processing the transaction.

It should be noted that although the simplified example depicted undo changes being applied to on a block level basis, in certain embodiments, recovery is performed at the row level such that only those changes that correspond to rows that are of interest to the new transaction are applied to the corresponding containers. For example, instead of applying undo changes for both rows 2 and 3, only the changes row 2 are applied to container 725 as it is the row that is needed by the new transaction.

CONCURRENCY CONTROL

Before a recovery process can perform a block level recovery on a particular dead transaction, the process must first obtain an exclusive lock to prevent two separate processes from performing recovery on the same container at the same time. In certain embodiments, the process wanting to perform a recovery must first obtain an exclusive lock on the undo records that are held by the dead transaction. The exclusive lock prevents other processes from concurrently recovering the same undo record at the same time.

In certain embodiments, a global recovery lock is provided that allows only a single process to perform recovery on a dead transaction at any point in time. When a process needs to perform a block level recovery on a particular dead transaction, the process first requests a global recovery lock for the particular dead transaction. Once the process obtains the global recovery lock for the particular dead transaction, the process may begin to perform block level recovery on the transaction records of the dead transaction. After the process has completed the block level recovery, the global recovery lock for the particular dead transaction is released.

APPLYING REDO RECORDS FOR A PARTICULAR RESOURCE

In certain embodiments, redo records for a particular resource (e.g. data container) are connected with each other to form a block-based redo chain that allows only those redo records that correspond to a particular resource to be applied. By connecting redo records in an ordered sequence, when a new transaction tries to access a resource that is locked by a dead transaction, the redo for the particular resource can be applied without having to apply redo to other resources that are not of interest. For explanation purposes, the applying of redo records for a particular resource shall be described at the data container level.

Figure 13:
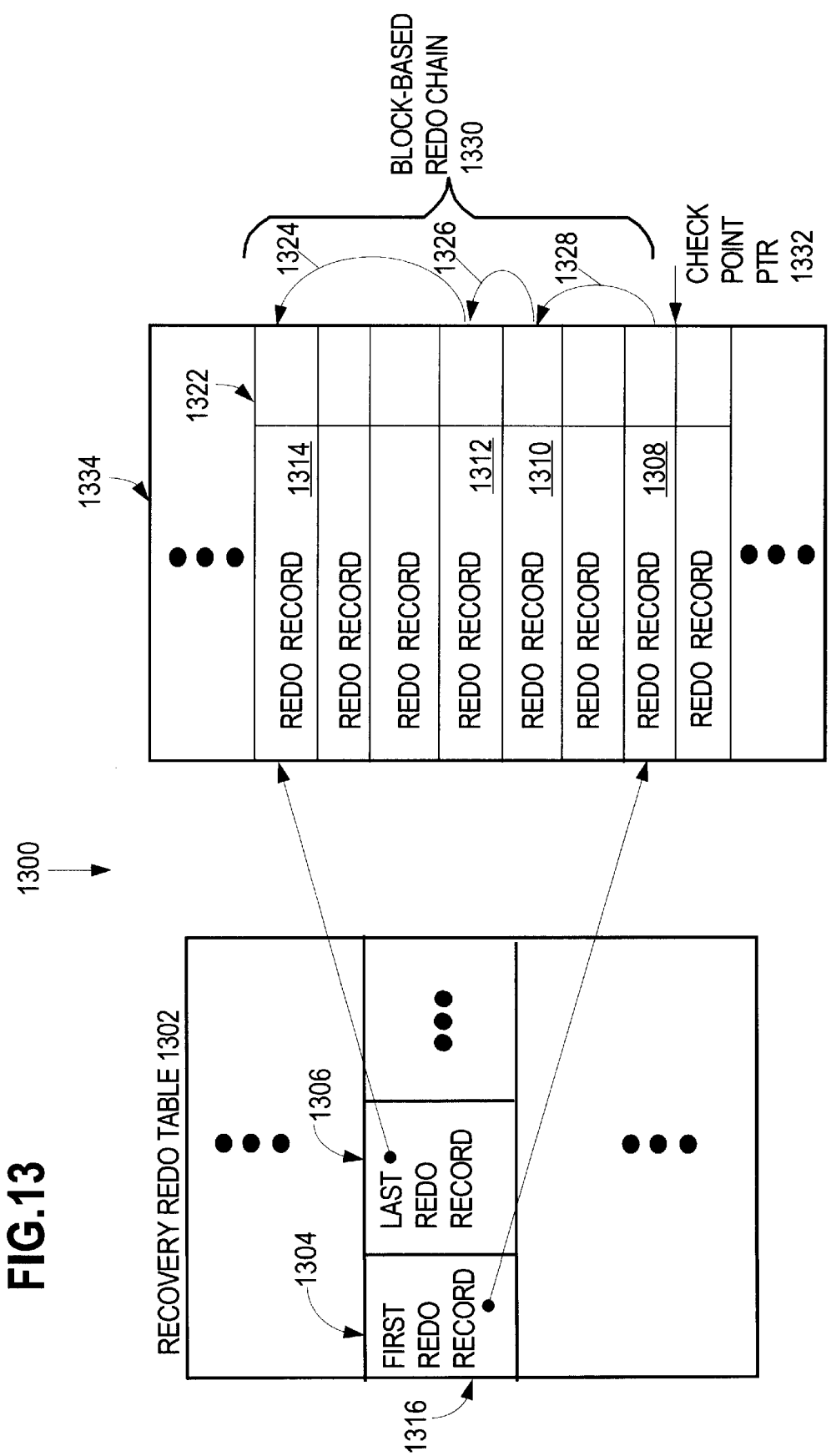
FIG. 13 illustrates a system for applying redo changes on a block level basis.

FIG. 13 illustrates a database system 1300 that contains a redo buffer log 1334 that includes a plurality of redo records and a recovery redo table 1302 that contains entries for connecting to the first and last redo records for a particular container. In certain embodiments, the recovery redo table is maintained within the particular container in which it is associated.

Each redo record contains a redo record pointer. Redo records that contain redo information for the same container are linked together to form a block-based redo chain. For example, redo records 1308, 1310, 1312 and 1314 contain changes for container #823 and are linked together by redo record pointers 1324, 1326 and 1328 to form a block-based redo chain 1330. In this example, an entry 1316 is associated with container #823 and contains a first redo record pointer 1304 and a last redo record pointer 1306. First redo record pointer 1304 points to a redo record 1308 in block-based redo chain 1330 which contains the least recent change made to container #823 as of a particular checkpoint time. The last redo record pointer 1306 points to the last redo record 1314 in block-based redo chain 1330 which contains the most recent change made to container #823 as of the particular checkpoint time. In certain embodiments, each redo record is associated with an applied flag 1322 that is used to indicate whether a particular redo record has been applied to the corresponding container. A checkpoint pointer 1332 provides a checkpoint time by pointing to the beginning of the first redo record in redo log buffer 1334 that will need to be applied to database system 1300 if a crash occurs.

As redo records are generated for a particular container, pointers associated with each redo record are updated to sequentially link the redo records into the block-based redo chain. Conversely, as redo records are applied to a particular container, pointers associated with each redo record are updated to remove the redo records from the block-based redo chain. Thus, when a new transaction tries to access information in a container that is held by a dead transaction, a particular entry in the recovery redo table 1302 can be used to sequentially apply only those redo records that correspond to the particular container.

For example, before redo record 1314 was added to the block-based redo chain 1330, redo record pointer 1324 in redo record 1312 pointed to NULL and the last redo record pointer 1306 pointed to the redo record 1312. In adding redo record 1314 to the block-based redo chain 1330, the redo record pointer 1324 in redo record 1312 is updated to point to redo record 1314 and the last redo record pointer 1306 is updated to point redo record 1312.

To apply the redo records associated with container #823, recovery redo table 1302 is used to identify an entry that is associated with container #823. In this example, entry 1316 in recovery redo table 1302 is associated with container #823. The first redo record pointer 1304 is then used to locate the redo record that contains the least recent change made to container #823 (redo record 1308). The information in redo record 1308 is then applied to container #823 and redo record pointer 1328 is used to find the next redo record that contains changes for container #823 (redo record 1310). The first redo record pointer 1304 is then updated to point to the next redo record 1310. In certain embodiments, after the changes in redo record 1308 are applied to container #823, an applied flag associated with redo record 1308 is updated to indicate that the changes in redo record 1308 have been applied to container #823. This sequence is then repeated until the changes in the last redo record (1314) in block-based redo chain 1330 have been applied to container #823. In certain embodiments, the last redo record pointer 1306 identifies the last redo record in a particular block-based redo chain that contain changes for a particular container. In another embodiment, a NULL redo record pointer identifies the corresponding redo record as the last redo record in a particular block-based redo chain that contains changes for a particular container.

In certain embodiments, when a redo record is applied, the corresponding first redo record pointer is advanced to point to the redo record that contains the next least recent changes that corresponds to the particular container. For example, if the changes in redo record 1308 are applied to container #823 then first redo record pointer 1304 is updated to point to redo record 1310.

APPLYING REDO RECORDS IN PARALLEL

In certain embodiments, multiple sets of redo records are identified such that each set of redo records does not contain any redo records that depend on any redo records in any other set of redo records. By applying redo records from the multiple sets of redo records in parallel, a reduction in recovery process time can be achieved. For explanation purposes, applying redo records in parallel shall be described at the container level.

Figure 14:
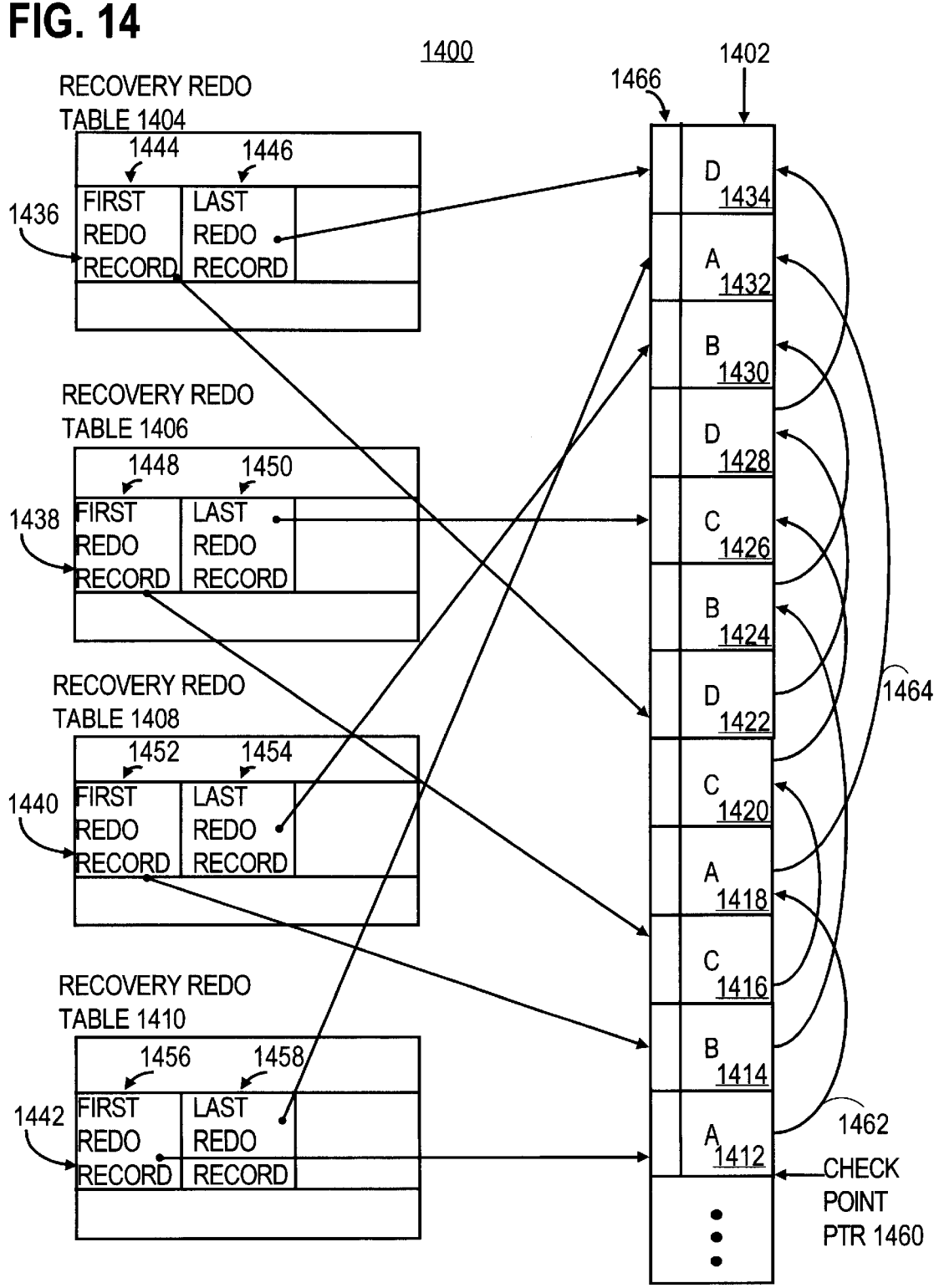
FIG. 14 illustrates a database system for applying redo records in parallel to provide for a reduction in recovery time.

FIG. 14 illustrates a database system 1400 that contains a redo buffer log 1402 that includes a plurality of redo records (1412–1434) and a plurality of recovery redo tables 1436, 1438, 1440 and 1442 that contains entries for connecting to the first and last redo records for a particular container. In certain embodiments, the recovery redo tables are maintained within the particular container in which it is associated.

As depicted in FIG. 14, each redo record contains a redo record pointer. Redo records that contain redo information for the same container are linked together to form a block-based redo chain. For example, redo records 1412, 1418 and 1432 contain changes for container A and are linked together by redo record pointers 1462 and 1464 to form a block-based redo chain. In this example, entry 1436 is associated with container D, entry 1438 is associated with container C, entry 1440 is associated with container B, and entry 1442 is associated with container A. Each entry contains a first redo record pointer and a last redo record pointer. The first redo record pointer points to a redo record in block-based redo chain which contains the least recent change made to the corresponding container as of a particular checkpoint time. The last redo record pointer points to the last redo record in the block-based redo chain which contains the most recent change made to the corresponding container as of the particular checkpoint time. In certain embodiments, each redo record is associated with an applied flag 1466 that is used to indicate whether a particular redo record has been applied to the corresponding container. A checkpoint pointer 1460 provides a checkpoint time by pointing to the beginning of the first redo record in redo log buffer 1402 that will need to be applied to database system 1400 if a crash occurs.

By linking the redo records that are associated with each container, multiple recovery processes can be used to apply the redo records in parallel. For example, by assigning recovery processes "1", "2", "3" and "4" respectfully to containers A, B, C and D, using the recovery processes, the redo records associated with different containers can be applied in parallel. By applying the redo records in parallel, the amount of time that is required to recover after a crash can be significantly reduced.

In certain embodiments, a first redo record pointer is not required for identifying the first redo record for a particular container. Instead, when a crash occurs, recovery begins at the checkpoint value. When a redo record is encountered for a "new" container the redo record represents the first redo record for the "new" container. A recovery process is then assigned to apply the redo records that are associated with the "new" container. By using multiple recovery processes, redo records associated with different containers can be recovered in parallel.

For example, starting at checkpoint pointer 1460, redo record 1412 is the first redo record encountered. Redo record 1412 represents a redo record for a "new" container since it is the first redo record associated with container A that has been encountered since the checkpoint pointer 1460. A recovery process is then assigned to apply the redo records (1412, 1418 and 1432) for container A. The next redo record (1414) is then read. Again, redo record 1414 represents a redo record for a "new" container since it is the first redo record associated with container B that has been encountered since the checkpoint pointer 1460. A recovery process is then assigned to apply the redo records (1414, 1424 and 1430) for container B. The next redo record (1416) is then read. Here again, redo record 1416 represents a redo record for a "new" container since it is the first redo record associated with container C that has been encountered since the checkpoint pointer 1460. A recovery process is then assigned to apply the redo records (1414, 1424 and 1430) for container B.

However, when redo record 1418 is encountered, redo record 1418 does not represent a redo record for a "new" container since it is not the first redo record associated with container A that has been encountered since the checkpoint pointer 1460. Therefore, a recovery process is not assigned to apply the redo record and instead the next redo record is read from 1402. Thus, by identifying redo records that are associated with "new" containers, multiple recovery servers can be used to apply redo records that are associated with different containers in parallel.

The block level recovery mechanism described herein allows changes made by a transaction to be recovered at the block level. In using the block level recovery mechanism, a new transaction that encounters a rowlock held by a dead transaction does not have to wait until the dead transaction is fully recovered before it can proceed. Instead, by applying block level recovery, the new process need only wait for those undo records that contain changes to the particular block of interest to be applied before it is allowed to continue processing.

In certain embodiments, a row level recovery mechanism is provided which allows recovery to be performed at the row level. By applying row level recovery, the new process need only wait for changes to the particular row of interest to be applied before it is allowed to continue processing.

Although the previous examples have depicted the transaction list sections as being contained within a corresponding container, in certain embodiments, the transaction list sections are maintained outside the corresponding container.

In certain embodiments, by combining the application of redo records and undo records as described herein, a new transaction does not have to wait for redo records and/or undo records to be applied before it can begin executing. Instead, the new transaction can begin executing the moment the database server is brought back up after a failure or planned shutdown. In certain embodiments, during cache recovery, undo records are recovered by first applying the redo records.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for removing changes made by a dead transaction, the method comprising the step of:
   prior to dying, a transaction making a first change;
   after making said first change and prior to dying, said transaction making a second change; and
   after said transaction has died, undoing said first change made by said dead transaction prior to undoing said second change made by said dead transaction.

2. The method of claim 1, wherein:
   the step of undoing the first change includes the steps of applying one or more undo changes contained in a first undo record to a first resource; and the step of undoing the second change includes the steps of applying one or more undo changes contained in a second undo record to a second resource;

wherein the first resource and the second resource are not the same resource.

3. The method of claim 2, further comprising the step of following a resource-based undo chain to locate one or more undo records that contain the one or more undo changes that correspond to the first resource.

4. The method of claim 2, wherein:

the first resource is a particular row in a data block;

said one or more undo changes are identified in an undo block that further includes undo changes for other resources; and the step of applying the one or more undo changes includes the step of applying only the one or more undo changes associated with that particular row in the data block.

5. The method of claim 4, wherein the step of applying the one or more undo changes is performed in response to a new transaction requiring access to the particular row in the data block, wherein the particular row is locked by a dead transaction.

6. The method of claim 5, wherein, prior to the dead transaction dying, generating a resource-based undo record chain by linking one or more undo records that contain the one or more undo changes that correspond to the first resource.

7. The method of claim 2, wherein the step of applying the one or more undo changes contained in the first undo record to the first resource includes the step of setting an applied flag associated with the first undo record, wherein the applied flag indicates whether changes in the first undo record have previously been applied.

8. The method of claim 3, further comprising the step of applying the one or more undo changes contained in the one or more undo records to the first resource.

9. The method of claim 8, wherein the step of applying the one or more undo changes contained in the one or more undo records to the first resource includes the step of setting an applied flag associated with each of the one or more undo records, wherein the applied flags indicate whether changes in the one or more undo records have previously been applied.

10. The method of claim 2, further includes the steps of:

migrating a row of data from the first resource to a third resource;

generating a copy of a transaction list section that is associated with the first resource;

associating the copy of the transaction list section with the third resource, wherein the copy of the transaction list section is used to identify and apply one or more undo changes to the migrating row.

11. A computer-readable medium carrying one or more sequences of one or more instructions for removing changes made by a dead transaction, the one or more sequences of one or more instructions including instructions which, when executed by one or more processors, cause the one or more processors to perform the steps of:

prior to dying, a transaction making a first change;

after making said first change and prior to dying, said transaction making a second change; and after said transaction has died, undoing said first change made by said dead transaction prior to undoing said second change made by said dead transaction.

12. The computer-readable medium of claim 11, wherein:

the step of undoing the first change includes the steps of applying one or more undo changes contained in a first undo record to a first resource; and the step of undoing the second change includes the steps of applying one or more undo changes contained in a second undo record to a second resource;

wherein the first resource and the second resource are not the same resource.

13. The computer-readable medium of claim 12, further comprising instructions for performing the step of following a resource-based undo chain to locate one or more undo records that contain the one or more undo changes that correspond to the first resource.

14. The computer-readable medium of claim 12, wherein:

the first resource is a particular row in a data block;

said one or more undo changes are identified in an undo block that further includes undo changes for other resources; and the step of applying the one or more undo changes includes the step of applying only the one or more undo changes associated with that particular row in the data block.

15. The computer-readable medium of claim 14, wherein the step of applying the one or more undo changes is performed in response to a new transaction requiring access to the particular row in the data block, wherein the particular row is locked by a dead transaction.

16. The computer-readable medium of claim 15, wherein, prior to the dead transaction dying, generating a resource-based undo record chain by linking one or more undo records that contain the one or more undo changes that correspond to the first resource.

17. The computer-readable medium of claim 12, wherein the step of applying the one or more undo changes contained in the first undo record to the first resource includes the step of setting an applied flag associated with the first undo record, wherein the applied flag indicates whether changes in the first undo record have previously been applied.

18. The computer-readable medium of claim 13, further comprising instructions for performing the step of applying the one or more undo changes contained in the one or more undo records to the first resource.

19. The computer-readable medium of claim 18, wherein the step of applying the one or more undo changes contained in the one or more undo records to the first resource includes the step of setting an applied flag associated with each of the one or more undo records, wherein the applied flags indicate whether changes in the one or more undo records have previously been applied.

20. The computer-readable medium of claim 12, further includes instructions for performing the steps of:

migrating a row of data from the first resource to a third resource;

generating a copy of a transaction list section that is associated with the first resource;

associating the copy of the transaction list section with the third resource, wherein the copy of the transaction list section is used to identify and apply one or more undo changes to the migrating row.

21. A system for removing changes made by a dead transaction, the system comprising:

a memory;

one or more processors coupled to the memory; and a set of computer instructions contained in the memory, the set of computer instructions including computer instructions which when executed by the one or more processors, cause the one or more processors to perform the steps of:
prior to dying, a transaction making a first change;
after making said first change and prior to dying, said transaction making a second change; and
after said transaction has died, undoing said first change made by said dead transaction prior to undoing said second change made by said dead transaction.

22. The system of claim 21, wherein:
the step of undoing the first change includes the steps of applying one or more undo changes contained in a first undo record to a first resource; and
the step of undoing the second change includes the steps of applying one or more undo changes contained in a second undo record to a second resource;
wherein the first resource and the second resource are not the same resource.

23. The system of claim 22, further comprising the step of following a resource-based undo chain to locate one or more undo records that contain the one or more undo changes that correspond to the first resource.

24. The system of claim 22, wherein:
the first resource is a particular row in a data block;
said one or more undo changes are identified in an undo block that further includes undo changes for other resources; and
the step of applying the one or more undo changes includes the step of applying only the one or more undo changes associated with that particular row in the data block.

25. The system of claim 24, wherein the step of applying the one or more undo changes is performed in response to a new transaction requiring access to the particular row in the data block, wherein the particular row is locked by a dead transaction.

26. The system of claim 25, wherein, prior to the dead transaction dying, generating a resource-based undo record chain by linking one or more undo records that contain the one or more undo changes that correspond to the first resource.

27. The system of claim 22, wherein the step of applying the one or more undo changes contained in the first undo record to the first resource includes the step of setting an applied flag associated with the first undo record, wherein the applied flag indicates whether changes in the first undo record have previously been applied.

28. The system of claim 23, further comprising the step of applying the one or more undo changes contained in the one or more undo records to the first resource.

29. The system of claim 28, wherein the step of applying the one or more undo changes contained in the one or more undo records to the first resource includes the step of setting an applied flag associated with each of the one or more undo records, wherein the applied flags indicate whether changes in the one or more undo records have previously been applied.

30. The system of claim 22, further includes the steps of:
migrating a row of data from the first resource to a third resource;
generating a copy of a transaction list section that is associated with the first resource;
associating the copy of the transaction list section with the third resource, wherein the copy of the transaction list section is used to identify and apply one or more undo changes to the migrating row.

31. A method for applying changes in two or more recovery records in parallel, wherein a plurality of resources are locked by a dead transaction, the method comprising the steps of:
identifying, within a single recovery log file a plurality of sets of recovery records, wherein each set of recovery records does not contain any recovery records that depend on any recovery records in any other set of recovery records; and
applying the plurality of sets of recovery records in parallel relative to one another.

32. The method of claim 31, wherein the step of establishing the plurality of sets of recovery records, comprises the steps of:
within the single recovery log file;
assigning all recovery records that are associated with a first resource to a first set of recovery records; and
assigning all recovery records that are associated with a second resource to a second set of recovery records.

33. The method of claim 32, wherein:
the step of assigning all recovery records that are associated with the first resource includes the step of linking in a first chain recovery records that contain changes that are associated with the first resource; and
the step of assigning all recovery records that are associated with the second resource includes the step of linking in a second chain recovery records that contain changes that are associated with the second resource.

34. The method of claim 33, wherein:
the step of linking in the first chain recovery records that contain changes that are associated with the first resource includes the step of generating a first block-based recovery chain, wherein the first block-based recovery chain contains recovery records that contain changes that need to be applied to the first resource; and
the step of linking in the second chain recovery records that contain changes that are associated with the second resource includes the step of generating a second block-based recovery chain, wherein the second block-based recovery chain contains recovery records that contain changes that need to be applied to the second resource.

35. A computer-readable medium carrying one or more sequences of instructions which, when executed by one or more processors, causes the one or more processors to perform the method recited in claim 31.

36. A computer-readable medium carrying one or more sequences of instructions which, when executed by one or more processors, causes the one or more processors to perform the method recited in claim 32.

37. A computer-readable medium carrying one or more sequences of instructions which, when executed by one or more processors, causes the one or more processors to perform the method recited in claim 33.

38. A computer-readable medium carrying one or more sequences of instructions which, when executed by one or more processors, causes the one or more processors to perform the method recited in claim 34.

39. A method for linking recovery records, the method comprising the steps of:
identifying a recovery record, wherein the recovery record contains change information that reflects a chance to said particular resource;
linking the recovery record into a recovery record chain, wherein the recovery record chain contains only recovery records that contain change information that reflect one or more changes to said particular resource; and wherein the step of linking the recovery record includes generating identifying data within at least one of the records in the recovery record chain or within the recovery record, wherein said identifying data once generated identifies a particular record in the recovery record chain.

40. The method of claim 39, wherein:

the step of identifying the recovery record includes the step of identifying a recovery record that contains change information that is associated with a particular data block; and the step of linking the recovery record into the recovery record chain, includes the step of linking the recovery record into the recovery record chain, wherein the recovery record chain contains only recovery records that contain change information that is associated with the particular data block.

41. The method of claim 39, further comprising the steps of:

identifying a first recovery record, wherein relative to said first recovery record chain the first recovery record contains the least recent change information that needs to be applied to the particular resource; and linking a first recovery record pointer to the first recovery record chain.

42. The method of claim 39, further comprising the steps of:

identifying a last recovery record, wherein the last recovery record contains the most recent change information that needs to be applied to the particular resource; and linking a last recovery record pointer to the recovery record chain.

43. The method of claim 39, wherein:

the step of identifying the recovery record that contains change information that is associated with the particular resource includes the step of identifying a record of recovery, wherein the record of recovery contains change information that needs to be applied to the particular resource; and the step of linking the recovery record includes the step of linking the record of recovery into the recovery record chain, wherein the recovery record chain contains only records of recovery that contain change information that needs to be applied to the particular resource.

44. A computer-readable medium carrying one or more sequences of instructions which, when executed by one or more processors, causes the one or more processors to perform the method recited in claim 39.

45. A computer-readable medium carrying one or more sequences of instructions which, when executed by one or more processors, causes the one or more processors to perform the method recited in claim 40.

46. A computer-readable medium carrying one or more sequences of instructions which, when executed by one or more processors, causes the one or more processors to perform the method recited in claim 41.

47. A computer-readable medium carrying one or more sequences of instructions which, when executed by one or more processors, causes the one or more processors to perform the method recited in claim 42.

48. A computer-readable medium carrying one or more sequences of instructions which, when executed by one or more processors, causes the one or more processors to perform the method recited in claim 43.

49. A method for removing changes made by a dead transaction, the method comprising the step of:

executing a new transaction that requires a resource that is locked by the dead transaction; and in response to detecting that the resource is locked by the dead transaction, applying undo changes to only a portion of the resources that are locked by the dead transaction, wherein the portion of the resources does not include all resources held by the dead transaction.

50. The method of claim 49, wherein:

the resource that is locked by the dead transaction is a row; and the step of applying undo changes to only a portion of the resources, includes the step of applying undo changes to one or more rows that locked by the dead transaction, wherein the one or more rows do not include all rows locked by the dead transaction.

51. A computer-readable medium carrying one or more sequences of instructions which, when executed by one or more processors, causes the one or more processors to perform the method recited in claim 49.

52. A computer-readable medium carrying one or more sequences of instructions which, when executed by one or more processors, causes the one or more processors to perform the method recited in claim 50.

* * * * *